US010717826B2

(12) United States Patent
Duchateau et al.

(10) Patent No.: US 10,717,826 B2
(45) Date of Patent: Jul. 21, 2020

(54) PROCESS FOR THE PREPARATION OF POLYOLEFIN-BASED GRAFT COPOLYMERS COMPRISING A FIRST LONG CHAIN BRANCHED POLYOLEFIN BLOCK AND ONE OR MULTIPLE POLYMER SIDE CHAINS

(71) Applicant: SABIC GLOBAL TECHNOLOGIES B.V., Bergen op Zoom (NL)

(72) Inventors: Robbert Duchateau, Eindhoven (NL); Miloud Bouyahyi, Eindhoven (NL); Lidia Jasinska-Walc, Eindhoven (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 80 days.

(21) Appl. No.: 15/781,796

(22) PCT Filed: Nov. 21, 2016

(86) PCT No.: PCT/EP2016/078295
§ 371 (c)(1),
(2) Date: Jun. 6, 2018

(87) PCT Pub. No.: WO2017/097568
PCT Pub. Date: Jun. 15, 2017

(65) Prior Publication Data
US 2018/0371176 A1 Dec. 27, 2018

(30) Foreign Application Priority Data
Dec. 9, 2015 (EP) .................................... 15198656

(51) Int. Cl.
| C08G 81/02 | (2006.01) |
| C08G 63/82 | (2006.01) |
| C08F 8/06 | (2006.01) |
| C08F 2/38 | (2006.01) |
| C08F 8/14 | (2006.01) |
| C08F 210/02 | (2006.01) |
| C08F 4/6592 | (2006.01) |
| C08F 4/659 | (2006.01) |

(52) U.S. Cl.
CPC .............. *C08G 81/027* (2013.01); *C08F 2/38* (2013.01); *C08F 8/06* (2013.01); *C08F 8/14* (2013.01); *C08F 210/02* (2013.01); *C08G 63/823* (2013.01); *C08F 4/6592* (2013.01); *C08F 4/65908* (2013.01); *C08F 4/65927* (2013.01); *C08F 2420/02* (2013.01); *C08F 2800/10* (2013.01); *C08F 2810/50* (2013.01)

(58) Field of Classification Search
CPC ................................................ C08F 4/65927; C08F 4/6592; C08F 4/65912; C08F 230/04
See application file for complete search history.

(56) References Cited

U.S. PATENT DOCUMENTS

| 4,414,132 | A | 11/1983 | Goodall et al. |
| 4,978,648 | A | 12/1990 | Barbe et al. |
| 5,077,357 | A | 12/1991 | Job |
| 5,106,806 | A | 4/1992 | Job |
| 5,556,820 | A | 9/1996 | Funabashi et al. |
| 5,939,495 | A | 8/1999 | Kioka et al. |
| 6,028,151 | A | 2/2000 | Wasserman et al. |
| 6,258,902 | B1 | 7/2001 | Campbell, Jr. et al. |
| 10,465,018 | B2 * | 11/2019 | Duchateau ............ C08F 210/16 |
| 2001/0041779 | A1 | 11/2001 | Shin et al. |
| 2008/0311812 | A1 | 12/2008 | Arriola et al. |
| 2009/0048399 | A1 | 2/2009 | Reijntjens et al. |
| 2010/0029871 | A1 | 2/2010 | Crowther et al. |
| 2011/0028657 | A1 | 2/2011 | Clark et al. |
| 2014/0039138 | A1 | 2/2014 | Giesbrecht et al. |
| 2014/0039139 | A1 | 2/2014 | Giesbrecht et al. |
| 2014/0039140 | A1 | 2/2014 | Giesbrecht et al. |
| 2014/0350200 | A1 | 11/2014 | Batinas-Geurts et al. |
| 2017/0355786 | A1 * | 12/2017 | Duchateau ............. C08F 10/00 |
| 2018/0251585 | A1 * | 9/2018 | Bouyahyi ................ C08F 2/38 |

FOREIGN PATENT DOCUMENTS

| EP | 1092730 A1 | 4/2001 |
| EP | 1270647 A1 | 1/2003 |
| EP | 1283222 A1 | 2/2003 |
| EP | 3034544 A1 | 6/2016 |

(Continued)

OTHER PUBLICATIONS

Shiono et al., Macromolecules, 35, 6760-6762 (2002).*
Chen et al., "Cocatalysts for Metal-Catalyzed Olefin Polymerization: Activators, Activation Processes, and Structure-Activity Relationships," Chem. Rev. 2000, 100, pp. 1391-1434.
Descour et al., "In situ compatibilisation of alkenyl-terminated polymer blends using cross metathesis," RSC Adv., 2015, 5, pp. 9658-9666.
International Search Report for International Application No. PCT/EP2016/078295, International Filing Date Nov. 21, 2016, dated Feb. 24, 2017, 6 pages.
Pullukat, Thomas J. and Hoff, Raymond E., "Silica-Bases Ziegler-Natta Catalystis: A Patent Review", Catal. Rev.-Sci. Eng. 41(3&4), 1999, pp. 389-438.

(Continued)

*Primary Examiner* — Jeffrey C Mullis
(74) *Attorney, Agent, or Firm* — Cantor Colburn LLP

(57) ABSTRACT

The present invention relates to a process for the preparation of polyolefin-based graft copolymers comprising a first long chain branched polyolefin block and one or multiple polymer side chains. The functionalized long chain branched polyolefin is produced via the copolymerization of an olefin monomer and an olefin bearing a main group metal hydrocarbyl functionality. The invention moreover relates to polyolefin obtained by said process ends. Subsequently the graft copolymers according to the invention can be produced for example by ring-opening polymerization of cyclic monomers or by transesterification of a preformed transesterifiable polymer, especially polyesters or polycarbonates. The invention moreover relates to polyolefin-based graft copolymers obtained by said process.

22 Claims, No Drawings

(56) References Cited

FOREIGN PATENT DOCUMENTS

| | | | |
|---|---|---|---|
| EP | 3037437 A1 | 6/2016 | |
| EP | 3037438 A1 | 6/2016 | |
| KR | 20090017896 A | 2/2009 | |
| KR | 2012120640 A | 11/2012 | |
| WO | 9319104 A1 | 9/1993 | |
| WO | 9613529 A1 | 5/1996 | |
| WO | 9632427 A1 | 10/1996 | |
| WO | 9742232 A1 | 11/1997 | |
| WO | 9742236 A1 | 11/1997 | |
| WO | 0043426 A1 | 7/2000 | |
| WO | 0109207 A2 | 2/2001 | |
| WO | 0123441 A1 | 4/2001 | |
| WO | 03014046 A1 | 2/2003 | |
| WO | 2004081064 A1 | 9/2004 | |
| WO | 2007134851 A1 | 11/2007 | |
| WO | 2011014533 A1 | 2/2011 | |
| WO | 201112897 A1 | 9/2011 | |
| WO | WO2017039993 | * | 3/2017 |

OTHER PUBLICATIONS

Qi-Zheng Li et al., "Well-Defined Polyolefin/Poly(ε-caprolactone) Diblock Copolymers: New Synthetic Strategy and Application," Journal of Polymer Science: Part A: Polymer Chemistry, vol. 49, 2011, pp. 511-517.
Written Opinion for International Application No. PCT/EP2016/078295, International Filing Date Nov. 21, 2016, dated Feb. 24, 2017, 6 pages.
Amin, Smruti B., et al., "Alkenylsilane Effects on Organotitanium-Catalyzed Ethylene Polymerization. Toward Simultaneous Polyolefin Branch and Functional Group Introduction," Journal of the American Chemical Society; 2006, pp. 4506-4507, vol. 128, No. 14.
Amin, Smruti B., et al., "Alkenylsilane Effects on Organotitanium-Catalyzed Ethylene Polymerization. Toward Simultaneous Polyolefin Branch and Functional Group Introduction," J. American Chemical Society; 2007, pp. 2938-2953, vol. 129, No. 10.
Arriola, D. et al., "Catalytic Production of Olefin Block Copolymers via Chain Shuttling Polymerization," Science; May 5, 2006, pp. 714-719, vol. 312.
Barta, Nancy S., et al., "Competitive intramolecular Ti-C versus Al-C alkene insertions: examining the role of Lewis acid cocatalysts in Ziegler-Natta alkene insertion and chain transfer reactions", Journal of Organometallic Chemistry 187 (1995) 47-53.
Boffa, Lisa S. and Novak, Bruce M., "Copolymerization of Polar Monomers with Olefins Using Transition-Metal Complexes", Chem. Rev. 2000, 100, 1479-1493.
Chen, Zhou, et al., "Copolymerization of Ethylene with Functionalized Olefins by [ONX] Titanium Complexes". Macromolecules 2013, 46, 2870-2875.
Chung, T. et al., "Metallocene-Mediated Olefin Polymerization with B—H Chain Transfer Agents: Synthesis of Chain-End Functionalized Polyolefins and Diblock Copolymers," Macromolecules; 2001, pp. 8040-8050, vol. 34, No. 23.
Chung, T.C. and Janvikul, W., "Borane-containing polyolefins: synthesis and applications", Journal of Organometallic Chemistry 581 (1999) 176-187.
Chung, T.C. and Rhubright, D., "Synthesis of Functionalized Polypropylene", Macromolecules 1991, 24, 970-972.
Chung, T.C., "Synthesis of Functional Polyolefin Copolymers With Graft and Block Structures," Prog. Polymer Science 27 (2002) pp. 39-85.
Chung, T.C., et al, "A novel synthesis of PP-b-PMMA copolymers via metallocene catalysis and borane chemistry" Polymer vol. 38 No. 6, pp. 1495 1502. 1997.
Chung, T.C., et al, "Synthesis of Ethylene-Propylene Rubber Graft Copolymers by Borane Approach", Macromolecules 1994, 27, 26-31.
Langston, Justin A., et al., "Synthesis and Characterization of Long Chain Branched Isotactic Polypropylene via Metallocene Catalyst and T-Reagent", Macromolecules 2007, 40, 2712-2720.
Makio, Haruyuki and Fujita, Terunori, "Synthesis of Chain-End Functionalized Polyolefins with a Bis(phenoxyimine) Titanium Catalyst" Macromol. Rapid Commun. 2007, 28, 698-703.
Nam et al., "Propene Polymerization with Stereospecific Metallocene Dichloride—[Ph3C] [B(C6F5)4] Using a-Alkenylaluminum as an Alkylation Reagent and as a Functional Comonomer," Macromolecules (2002), No. 35, pp. 6760-6762, 3 pages.
Shiono, Takeshi, et al, "Facile Synthesis of Hydroxy-Functionalized Cycloolefin Copolymer Using ω-Alkenylaluminium as a Comonomer", Macromol. Chem. Phys. 2013, 214, 2239-2244.
Xu, Guangxue and T.C. Chung, "Synthesis of Syndiotactic Polystyrene (s-PS) Containing a Terminal Polar Group and Diblock Copolymers Containing s-PS and Polar Polymers," Macromolecules; 1999, pp. 8689-8692, vol. 32.

* cited by examiner

PROCESS FOR THE PREPARATION OF POLYOLEFIN-BASED GRAFT COPOLYMERS COMPRISING A FIRST LONG CHAIN BRANCHED POLYOLEFIN BLOCK AND ONE OR MULTIPLE POLYMER SIDE CHAINS

CROSS REFERENCE TO RELATED APPLICATIONS

This application is a National Stage application of PCT/EP2016/078295, filed Nov. 21, 2016, which claims the benefit of European Application No. 15198656.9, filed Dec. 9, 2015, both of which are incorporated by reference in their entirety herein.

The present invention relates to a process for the preparation of polyolefin-based graft copolymers comprising a first long chain branched polyolefin block and one or multiple polymer side chains. The functionalized long chain branched polyolefin is produced via the copolymerization of an olefin monomer and an olefin bearing a main group metal hydrocarbyl functionality according to Formula 1a. The invention moreover relates to polyolefin obtained by said process ends. Subsequently the graft copolymers according to the invention can be produced for example by ring-opening polymerization of cyclic monomers or by transesterification of a preformed transesterifiable polymer, especially polyesters or polycarbonates. The invention moreover relates to polyolefin-based graft copolymers obtained by said process.

BACKGROUND

The present invention relates to the preparation of polyolefin-based graft copolymers comprising a first long chain branched polyolefin block and one or multiple polymer side chains, the intermediate products and the processes to obtain these products.

Commercially available polyethylene and polypropylene prepared using standard procedures with Ziegler-Natta or single-site catalysts have a predominantly linear molecular structure. Although linear polyolefins have many desirable physical properties, they show a variety of melt processing shortcomings, especially the single-site prepared ones having narrow molecular weight distributions, which typically have a low melt strength. Low melt strength is a problem because it causes local thinning in melt thermoforming, relative weakness in large-part blow molding and flow instabilities in co-extrusion of laminates.

One way of overcoming the shortcomings of linear polyolefins is by means of branching, viz. the provision of polymer side chains extending from the polyolefin backbone.

Despite their ubiquitous presence in our society, polyolefins such as polyethylene and polypropylene are not appropriate for several applications as a consequence of their inherently nonpolar character. This nonpolar character is the reason for the poor adhesion, printability and compatibility that can restrict their efficacy. Hence, it is further desirable to prepare polyolefins bearing for example polar groups so as to ensure a good adhesion and printability.

In the prior art copolymers have thus been prepared and considered to overcome the shortcomings of polyolefins mentioned above. However, the preparation of these copolymers is often complicated and cumbersome. Moreover, most preparation methods lack flexibility.

The present invention is directed towards an easy, catalyst-compatible, relatively inexpensive and safe process that can be used for large scale preparation of polyolefin-based graft copolymers comprising a first long chain branched polyolefin block and one or multiple polymer side chains.

SUMMARY OF THE INVENTION

In a first aspect, the present invention relates to a process for the preparation of polyolefin-based graft copolymers comprising a first long chain branched polyolefin block and one or multiple polymer side chains, said process comprising the step of:
A) a polymerization step comprising copolymerizing at least one first type of olefin monomer, preferably selected for example from ethylene or propylene, and at least one second type of olefin monomer comprising a main group metal hydrocarbyl functionality according to Formula 1a: $R^{100}_{(n-2)}R^{101}M^{n+}R^{102}$ using a catalyst system to obtain a polyolefin; wherein said catalyst system comprises a co-catalyst and/or a scavenger and a catalyst or catalyst precursor comprising a metal from Group 3-10 of the IUPAC Periodic Table of elements that can undergo chain transfer polymerization with the main group metal hydrocarbyl functionality of the second type of olefin monomer or that via a chain shuttling agent can undergo chain transfer polymerization with the main group metal hydrocarbyl functionality of the second type of olefin monomer and
wherein further M is a main group metal; n is the oxidation state of M; $R^{100}$, $R^{101}$ and $R^{102}$ of Formula 1a are each independently selected from the group consisting of a hydride, a C1-C18 hydrocarbyl group, a halide, an alkoxide, an amide, a thiolate or a hydrocarbyl group Q on the proviso that at least one of $R^{100}$, $R^{101}$ and $R^{102}$ is a hydrocarbyl group Q, wherein hydrocarbyl group Q is according to Formula 1b:

(Formula 1b)

wherein Z is bonded to M and Z is a C1-C18 hydrocarbyl group; $R^{105}$ optionally forms a cyclic group with Z; wherein $R^{103}$ and $R^{104}$ and $R^{105}$ are each independently selected from hydrogen or a hydrocarbyl group; and at least one step of:
B) an oxidizing step comprising contacting said polyolefin obtained in step A) with at least one oxidizing agent to obtain a polyolefin having one or more pending oxidized functionalities; and/or
C) contacting said polyolefin obtained in step B) with at least one quenching agent to obtain a polyolefin having one or more pending polar functionalities,
D) using the polyolefin having one or more pending polar functionalities obtained in step C) to obtain a graft copolymer by transesterification of a preformed transesterifiable polymer and/or by ring-opening polymerization of cyclic monomers, especially cyclic esters (lactones) and/or cyclic carbonates.

A polyolefin having one or more pending polar functionalities may be a polyolefin having a backbone preferably for example made of ethylene or propylene as well as of an olefin monomer comprising a main group metal hydrocarbyl functionality, as produced in step A), which has being subjected to an oxidative treatment in step B). The metal hydrocarbyl functionality of the second monomer can function as a chain transfer agent, giving rise to coordinative chain transfer polymerization. As a results of this, long chain branched polymers might be obtained having main group metal hydrocarbyl functionalities at the end of the chains/branches. Since the branches are actually growing chains as a result of the chain transfer process, they can also incorporate more of the second type of monomer, which will result in branches-on-branches structures. The second type of olefin monomer comprising a main group metal hydrocarbyl functionality can thereby comprise a spacer, like for example a substituted and/or unsubstituted alkyl chain and/or bridged or unbridged, substituted and/or unsubstituted, cyclic hydrocarbon, linking the olefin and the main group metal hydrocarbyl functionality. The second type of olefin monomer comprising a main group metal hydrocarbyl functionality can thereby comprise bridged or unbridged, substituted and/or unsubstituted, cyclic hydrocarbon as a spacer for example when a reactive cyclic olefin, especially for example a norbornene derivative comprising a main group metal hydrocarbyl functionality is used as the second type of olefin monomer.

A long chain branch can also preferably for example comprise between >100 to 100,000,000 carbon atoms, preferably between 500 to 10,000,000 carbon atoms, even more preferred between 1000 to 1,000,000 carbon atoms, more preferred between 10,000 to 500,000 carbon atoms, more preferred between 20,000 to 200,000 carbon atoms, preferably in the backbone, of the long chain branch. A long chain branch can also preferably for example be long enough to lead to entanglement phenomena, preferably involving the branch.

Pending polar functionalities may mean a functionality that preferably comprises at least one heteroatom that is different from carbon and hydrogen. Such a heteroatom may thereby be preferably more electronegative than carbon and/or hydrogen. A polar functionality can especially comprise for example a hydroxyl, carboxylic acid, amine or halogen functionality.

A heteroatom may be preferably for example selected from Group 14, 15, 16 or 17 of the IUPAC Periodic Table of the Elements and can as used in the present description for example especially mean a hetero atom selected from Si, Ge, Sn [Group 14], N, P, As, Sb, Bi [Group 15], O, S, Se, Te [Group 16] or halogens [Group 17].

Hydrocarbyl as used in the present description may means: a substituent containing hydrogen and/or carbon atoms; it may for example be a hydride or a linear, branched or cyclic saturated or unsaturated aliphatic substituent, such as for example alkyl, alkenyl, alkadienyl and alkynyl; alicyclic substituent, such as cycloalkyl, cycloalkadienyl cycloalkenyl; aromatic substituent or aryl, such as for example monocyclic or polycyclic aromatic substituent, as well as combinations thereof, such as alkyl-substituted aryls and aryl-substituted alkyls. It may be substituted with one or more non-hydrocarbyl, heteroatom-containing substituents or heteroatoms. Hence, when in the present description hydrocarbyl is used it can also mean a substituted hydrocarbyl, unless stated otherwise. Included in the term "hydrocarbyl" are also perfluorinated hydrocarbyls wherein all hydrogen atoms are replaced by fluorine atoms. A hydrocarbyl may moreover for example be present as a group on a compound (hydrocarbyl group) or it may be present as a ligand on a metal (hydrocarbyl ligand).

Alkyl as used in the present description means: a group consisting of carbon and hydrogen atoms having only single carbon-carbon bonds. An alkyl group may be straight or branched, un-substituted or substituted. It may contain aryl substituents. It may or may not contain one or more heteroatoms.

Aryl as used in the present description means: a substituent derived from an aromatic ring. An aryl group may or may not contain one or more heteroatoms. An aryl group also encloses substituted aryl groups wherein one or more hydrogen atoms on the aromatic ring have been replaced by hydrocarbyl groups.

Hydride as used in the present description may mean: a hydrogen anion bonded to a metal.

In an embodiment, at least one of $R^{100}$, $R^{101}$ and $R^{102}$ of Formula 1a can be a hydrocarbyl group Q and the remaining groups of $R^{100}$, $R^{101}$ and $R^{102}$ are each a C1-C18 hydrocarbyl group, preferably a C1-C10 hydrocarbyl group or wherein two groups of $R^{100}$, $R^{101}$ and $R^{102}$ are each a hydrocarbyl group Q and the remaining group of $R^{100}$, $R^{101}$ and $R^{102}$ is a C1-C18 hydrocarbyl group, preferably C1-C10 hydrocarbyl group, further preferred a C1-C4 hydrocarbyl group, or wherein all of $R^{100}$, $R^{101}$ and $R^{102}$ are a hydrocarbyl group Q. Expressions like for example "C1-C4" or "C1-C16" and similar formulations may refer to a range regarding a number of carbon atoms, here for example respectively from 1 to 4 or from 1 to 16 carbon atoms.

In an embodiment, a second type of olefin monomer comprising a main group metal hydrocarbyl functionality can be selected from the group consisting of bis(isobutyl)(5-ethylen-yl-2-norbornene) aluminum, di(isobutyl)(7-octen-1-yl) aluminum, di(isobutyl)(5-hexen-1-yl) aluminum, di(isobutyl)(3-buten-1-yl) aluminum, tris(5-ethylen-yl-2-norbornene) aluminum, tris(7-octen-1-yl) aluminum, tris(5-hexen-1-yl) aluminum, or tris(3-buten-1-yl) aluminum, ethyl(5-ethylen-yl-2-norbornene) zinc, ethyl(7-octen-1-yl) zinc, ethyl(5-hexen-1-yl) zinc, ethyl(3-buten-1-yl) zinc, bis(5-ethylen-yl-2-norbornene) zinc, bis(7-octen-1-yl) zinc, bis(5-hexen-1-yl) zinc, or bis(3-buten-1-yl) zinc. A cyclic unsaturated hydrocarbyl group can thereby lead for example to a high reactivity.

In an embodiment, the catalyst or catalyst precursor used in step A) may comprise a metal from Groups 3-10 of the IUPAC Periodic Table of elements, more preferably from Groups 3-8 from Groups 3-6 and/or wherein the metal catalyst or metal catalyst precursor used in step A) comprises a metal selected from the group consisting for example of Ti, Zr, Hf, V, Cr, Fe, Co, Ni, Pd, preferably Ti, Zr or Hf.

In an embodiment, said catalyst can be a Ziegler-Natta catalyst, such as for example titanium-magnesium and aluminum based Ziegler-Natta catalysts, especially obtained for example by reacting a titanium alkoxy with a magnesium alkoxy and subsequently reaction the reaction product with an aluminum alkyl halide, or a catalyst based on a Group 4 metal, which can especially be for example a metallocene, half-metallocene or a post-metallocene and/or a single-site catalyst.

In an embodiment, a catalyst precursor can be for example a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethyl silyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

In an embodiment, said catalyst precursor can be for example a so-called half-metallocene, or constrained geometry catalyst, even more preferably, C$_5$Me$_5$[(C$_6$H$_{11}$)$_3$P=N]TiCl$_2$, [Me$_2$Si(C$_5$Me$_4$)N(tBu)]TiCl$_2$, [C$_5$Me$_4$(CH$_2$CH$_2$NMe$_2$]TiCl$_2$. In an embodiment, said catalyst can be for example a so-called post-metallocene, preferably [Et$_2$NC(N(2,6-iPr$_2$—C$_6$H$_3$)]TiCl$_3$ or [N-(2,6-di(1-methylethyl)phenyl)amido)(2-isopropylphenyl)(α-naphthalen-2-diyl(6-pyridin-2-diyl)methane)]hafnium dimethyl.

For example oxygen, ozone or oxygen-containing gas mixtures such as air or synthetic air or mixtures of oxygen with other gases can be used as oxidizing agents in step B).

Moreover, at least one safe oxidation agent can for example be used in step B).

In an embodiment, at least safe oxidizing agent according to the invention used in step B) can for example be preferably selected from the group consisting of CO, CO$_2$, CS$_2$, COS, N$_2$O and SO$_3$, preferably, N$_2$O, CO$_2$ and SO$_3$ or mixtures of at least two or more thereof, even more preferably CO$_2$. A safe oxidizing agent in the sense of the present invention, can thereby be for example be an compound where at least one oxygen is bound at least one other atom then oxygen and/or a compound comprising at least one nitrogen-carbon CN double or triple bond. Using safe oxidants according to the present invention thereby allows reducing the process risk (especially for example the risk of fire and explosions) associated with the use of the oxidizing agent, so as to be able to easily scale up the reactions and/or use high pressures. Using more than one oxidizing agents can thereby for example lead to polymers having at least two or more different polar functionalities.

The inventors could thereby surprisingly show that the use of safe oxidizing agents did lead to an oxidation and/or functionalization yield equal or higher than with gaseous oxygen or oxygen containing gas mixtures could be obtained. Oxidation and/or functionalization yield can thereby preferably for example be >50%, preferred >60%, further preferred >70% or even further preferred >80%.

In a second aspect, the invention relates to a polyolefin having a content of polar functionalities of for example at most 0.1 mol-%, at most 1 mol-%, at most 3 mol-%, at most 5 mol-%, 10 mol-% and/or at least 0.001 mol-%, at least 10 mol-%, at least 15 mol-%, 25 mol-%, preferably at least 30 mol-%.

During step C) a quenching agent can be used to obtain preferably a polar function, like for example a hydroxyl function, at the branches.

In an embodiment, the reagent is a protic reagent. In a preferred embodiment the protic agent is water or an alcohol or a mixture thereof, preferably water.

It is possible that in a specific embodiment instead of a hydrolysis another type of quenching step is carried out. Said step is then preferably carried out using a non-protic metal-substituting quenching agent.

The present invention will be described in more detail below.

DETAILED DESCRIPTION OF THE INVENTION

The present invention concerns the copolymerization of an olefin monomer, preferably ethylene or propylene, and at least one second type olefin monomer, preferably also α-olefin, containing a main group metal hydrocarbyl functionality, to obtain long chain branches via chain transfer polymerization.

Thus, it can be said that the intermediate that is desired in the present invention is a polyolefin having one or multiple preferably long chain branches. The copolymer obtained in step A) can thereby be oxidized and/or optionally subsequently quenched to produce the desired end product.

Subsequently the graft copolymers according to the invention can be produced for example by ring-opening polymerization (ROP) of cyclic monomers and/or by transesterification of a preformed transesterifiable polymer, especially polyesters or polycarbonates. A transesterifiable polymer in the sense of the invention may thereby be for example a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination(s) thereof. The invention moreover relates to polyolefin-based graft copolymers obtained by said process.

This can for example be used for the preparation of polyolefins having pending polar functionalities via an additional oxidation step.

The present invention uses an olefin-comprising main group metal hydrocarbyl as comonomer. In other words, the olefin-comprising main group metal hydrocarbyl can be, for example, an alkene-comprising aluminum hydrocarbyl or an alkene-comprising zinc hydrocarbyl.

Step A):

The first step in the process according to the present invention is the preparation of a polyolefin having one or multiple main group metal functionalized branches by polymerizing at least one first type of olefin monomer, preferably a α-olefin, and at least one second type of olefin monomer, preferably an α-olefin, comprising a main group metal hydrocarbyl functionality, which functionalities as a chain transfer agent, with a metal catalyst that might undergo chain transfer polymerization with the main group metal hydrocarbyl functionality of the second type of olefin monomer either with or without chain shuttling agent, optionally a co-catalyst, optionally a scavenger and optionally one or more additional chain transfer agents and/or chain shuttling agents. In an embodiment, said main group metal hydrocarbyl functionality or a corresponding functionality can for example be an alkenyl-comprising aluminum hydrocarbyl or a corresponding functionality.

The second type of olefin monomer can comprise a main group metal hydrocarbyl functionality, which can for example be a reactive electrophilic metal group, which functionalities as a chain transfer agent. The metal hydrocarbyl functionality of the second monomer can function as a chain transfer agent, giving rise to coordinative chain transfer polymerization. As a results of this, long chain branched polymers might be obtained having main group metal hydrocarbyl functionalities at the end of the chains/branches. Since the branches are actually growing chains as a result of the chain transfer process, they can also incorporate more of the second type of monomer, which will result in branches-on-branches structures. The resulting polyolefin can have one or multiple branches comprising at least one reactive electrophilic metal functionality, preferably for example at the end of the branch(es). In other words, said product is a branched polyolefin that is functionalized on at least one of its branches with a main group metal.

A "main group metal" as used in the present description can refer to/mean: a metal that is of a main group, namely an element of groups 1, 2, and 13-15 of the period table or zinc. In other words, metals of:

Group 1: lithium (Li), sodium (Na), and potassium (K)
Group 2: beryllium (Be), magnesium (Mg), and calcium (Ca)
Group 13: boron (B), aluminum (Al), gallium (Ga), and indium (In)
Group 14: germanium (Ge), and tin (Sn)
Group 15: antimony (Sb), and bismuth (Bi) of the IUPAC Periodic Table of elements
main group metals also include for the context of the present invention zinc (Zn).

During the polymerization reaction according to step A) at least one olefin comprising a main group metal hydrocarbyl functionality (being for example a main group metal atom bearing one or more hydrocarbyl and/or hydride groups and at least one alkenyl group) is used. The product obtained in step A) is then a polyolefin having one or multiple main group metal-functionalized branches (being a branched polyolefin that is functionalized on at least one of its branches with a main group metal). This is considered to be the main product of step A), which is an intermediate product in the process according to the present invention.

The catalyst system used in step A) comprises: i) a Group 3-10, preferably Group 3-8 and more preferably Group 3-6, metal catalyst or metal catalyst precursor as well as optionally one or more of ii) a co-catalyst, iii) a scavenger and/or iv) optionally one or more chain transfer agents and/or chain shuttling agents.

According to the present invention, the catalyst can be selected, preferably so that it may lead to an interaction, especially to chain transfer, preferably without poisoning, with the main group metal hydrocarbyl functionality of the second type of olefin monomer. A catalyst that does lead to an interaction and/or to chain transfer polymerization may thereby preferably for example be a catalyst that does lead to interaction products detectable by NMR and/or to chain transfer products detectable by NMR and/or viscosity measurements. An example of a selection made in that way, may be the selection of a catalyst comprising zirconium (Zr) or titanium (Ti) as the metal, for example rac-Me$_2$Si(Ind)$_2$ZrCl$_2$, and of a main group metal hydrocarbyl functionality comprising aluminum (Al) as the metal for the second type of olefin monomer, since it is known that such a catalyst in the presence of a chain shuttling agent, preferably diethyl zinc, will lead to chain transfer polymerization with an aluminum hydrocarbyl functionality. In the sense of the present invention, poisoning may thereby for example a poisoning that may reduce catalyst activity by at least 50%, preferably by at least 25%, further preferred by at least 20%, even further preferred by at least 15%, even further preferred by at least 10%, even further preferred by at least 5%, even further preferred by at least 3%, even further preferred by at least 1%, even further preferred by at least 0.5%. Moreover, chain transfer polymerization in the sense of the present invention may thereby for example be a chain transfer polymerization that accounts for at least 50%, preferably by at least 25%, further preferred by at least 20%, even further preferred by at least 15%, even further preferred by at least 10%, even further preferred by at least 5%, even further preferred by at least 3%, even further preferred by at least 1%, even further preferred by at least 0.5% of the polymer material produced by polymerization according to the process of the present invention.

This may preferably allow the formation of polymers with long chain branches by polymerizing the olefins of the at least two comonomers with the catalyst used.

Metal catalyst as used in the present description may mean: a catalyst providing the catalytic reaction, wherein said catalyst comprises at least one metal center that forms the active site. In the context of the present invention a "metal catalyst" is the same as a "transition metal catalyst" wherein the metal is a transition metal.

Metal catalyst or a metal catalyst precursor according to the invention may be for example a single-site catalyst or Ziegler-Natta catalyst.

Catalyst precursor as used in the present description may mean: a compound that upon activation forms the active catalyst.

Single-site catalyst as used in the present description may mean especially for example: a metal catalyst or catalyst precursor that contains exclusively one type of active site. A single-site catalyst can thereby be a metallocene, half-metallocene or post-metallocene.

Metallocene as used in the present description may mean: a metal catalyst or catalyst precursor typically consisting of two substituted cyclopentadienyl (Cp) ligands bound to a metal active site.

Half-metallocene as used in the present description may for example mean: a metal catalyst or catalyst precursor typically consisting of one substituted cyclopentadienyl (Cp) ligand bound to a metal active site.

Post-metallocene as used in the present description may mean especially for example: a metal catalyst that contains no substituted cyclopentadienyl (Cp) ligands, but may contains one or more anions bound to the metal active site, typically via a heteroatom.

Ziegler-Natta catalyst as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1.

Transition metal as used in the present description may mean: a metal from any of the Groups 3-10 of the IUPAC Periodic Table of elements or in other words a Group 3 metal, a Group 4 metal, a Group 5 metal, a Group 6 metal, a Group 7 metal, a Group 8 metal, a Group 9 metal or a Group 10 metal.

Co-catalyst as used in the present description may mean a compound that activates the catalyst precursor to obtain the active catalyst.

In an embodiment, the co-catalyst can be selected for example from the group consisting of MAO, DMAO, MMAO, SMAO, possibly in combination with aluminum alkyls, for example triisobutyl aluminum, and the combination of an aluminum alkyl, for example triisobutyl aluminum, and fluorinated aryl borane or fluorinated aryl borate.

In an embodiment, the co-catalyst can be selected for example from aluminum alkyls and aluminum alkyl halides, such as for example triethyl aluminum (TEA) or diethyl aluminum chloride (DEAC).

In an embodiment, the scavenger can be selected for example from the group consisting of trialkyl aluminum, for example triisobutyl aluminum, MAO, DMAO, MMAO, SMAO.

Scavenger as used in the present description may mean a compound that scavenges impurities, especially protic and heteroatom containing compounds, such as for example water, alcohols or acids, from the reaction medium prior and during the polymerization process. The co-catalyst thereby also function for example as scavenger.

Olefins Suitable for Use in Step A)

Examples of suitable monomers include linear or branched α-olefins. Said olefins preferably have between 2 and 30 carbon atoms, more preferably between 2 and 20 carbon atoms. Preferably, one or more of the following are used: ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof. In addition, a combination of ethylene and/or propylene on the one and one or more other olefins on the other hand is also possible. Substituted analogues of the monomers discussed above may also be used, e.g. substituted by one or more halogens. In addition aromatic monomers can be used according to the present invention. It is also possible to use a combination of two or more olefins.

Main Group Hydrocarbyl Functionality

The present invention uses at least one olefin monomer comprising a main group hydrocarbyl functionality. The present invention may for example also use said monomer in combination with other main group metal chain transfer agents, for example zinc and/or magnesium and/or calcium and/or aluminum and/or boron and/or gallium hydrocarbyl/hydride chain transfer agents.

The olefin monomer comprising a main group metal hydrocarbyl functionality used in the present invention has a structure according to Formula 1a:

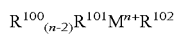

Formula 1a wherein: M is a main group metal; n is the oxidation state of M; $R^{100}$, $R^{101}$ and $R^{102}$ are each independently selected from the group consisting of a hydride, a C1-C18 hydrocarbyl group, or a hydrocarbyl group Q on the proviso that at least one of $R^{100}$, $R^{101}$ and $R^{102}$ is hydrocarbyl group Q. Wherein hydrocarbyl group Q is according to Formula 1b:

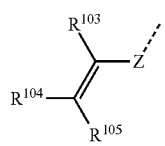

Formula 1b wherein Z is bonded to M and is a C1-C18 hydrocarbyl group; $R^{105}$ optionally forms a cyclic group with Z; wherein $R^{103}$ and $R^{104}$ and $R^{105}$ are each independently selected from hydrogen or hydrocarbyl;

In an embodiment, hydrocarbyl group Q is an α-olefin wherein Z is bonded to the main group metal, Z is a C1-C18 hydrocarbyl spacer group, $R^{103}$ $R^{104}$ and $R^{105}$ are each hydrogen, said hydrocarbyl group Q being according to Formula 1c:

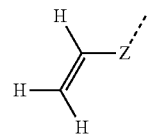

Formula 1c

In an embodiment, hydrocarbyl group Q is an alkene wherein Z is bonded to the main group metal, Z is a C1-C18 hydrocarbyl spacer group, $R^{103}$ and $R^{104}$ are independently hydrogen or hydrocarbyl and R105 is a C1-18 hydrocarbyl, said $R^{105}$ group forming a cyclic structure with Z, said hydrocarbyl group Q being according to Formula 1d:

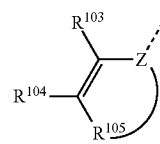

Formula 1d

In an embodiment, said hydrocarbyl group Q can be an α-olefin according to Formula 1c or an unsaturated cyclic hydrocarbyl group according to Formula 1d. Preferably, hydrocarbyl group Q is an α-olefin or an unsaturated cyclic hydrocarbyl group.

Z is a branched or unbranched hydrocarbyl spacer group consisting of between 1 and 18 carbon atoms, preferably 2 and 8 carbon atoms, more preferably 4 and 7 carbon atoms, even more preferably 5 or 6 carbon atoms. Z is optionally substituted with hydrogen, carbon, and heteroatoms.

In an embodiment, hydrocarbyl group Q is an α-olefin according to Formula 1c. Said α-olefin has up to and including 30 carbon atoms, such as up to and including 20 carbon atoms, preferably up to and including 10 carbon atoms, such as ethenyl, propenyl, butenyl, heptenyl, hexenyl, septenyl, octenyl, nonenyl or decenyl and can be unbranched or branched.

In a preferred embodiment, said α-olefin is an unbranched α-olefin according to Formula 1e. In other words, the aluminum hydrocarbyl functionality comprises at least one hydrocarbyl chain bearing an α-olefin (i.e. hydrocarbyl group Q). Said hydrocarbyl group Q is an α-olefin-comprising a main group metal.

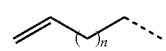

Formula 1e

In a preferred embodiment, hydrocarbyl group Q is an α-olefin according to Formula 1e where n is 1-5. In other words, the hydrocarbyl group Q is 3-buten-1-yl, 4-penten-1-yl, 5-hexen-1-yl, 6-hepten-1-yl or 7-octen-1 yl.

In an embodiment, the hydrocarbyl group Q is an unsaturated cyclic hydrocarbyl group according to Formula 1d. In said cyclic olefin the alkene is situated between substituents $R^{105}$ and Z and $R^{105}$ forms at least one ring with Z. $R^{105}$ can be a C1-C18 hydrocarbyl, which forms one or more bonds with Z to form a cyclic group.

The number of R groups around the main group metal is dependent on the oxidization state of the metal. For example, when the main group metal is zinc or magnesium or calcium, the oxidation state is +2, and the formula is $R^{100}MR^{101}$.

For example, when the main group metal is aluminum or boron or gallium, the oxidation state is +3, and the formula is $R^{100}R^{101}MR^{102}$.

In a preferred embodiment, at least one olefin comprising a main group metal hydrocarbyl functionality can be for example ethyl(7-octen1-yl) zinc or bis(7-octen-1-yl) zinc.

In a preferred embodiment, an olefin comprising at least one main group metal hydrocarbyl functionality can for example be selected from one or more from the group of: di(isobutyl)(7-octen-1-yl) aluminum, di(isobutyl)(5-hexen-1-yl) aluminum, di(isobutyl)(3-buten-1-yl) aluminum, aluminum, tris(7-octen-1-yl) aluminum, tris(5-hexen-1-yl) aluminum and/or tris(3-buten-1-yl) aluminum.

In an embodiment, the copolymerization of at least one olefin comprising main group metal hydrocarbyl chain transfer agent functionality and another α-olefin monomer may also for example be carried out in the presence of an additional chain transfer agent or chain shuttling agent.

As non-limiting examples of chain transfer and/or chain shuttling agents main group metal hydrocarbyl or hydride chain transfer agents such as for example the following be used: one or more hydrocarbyl or hydride groups attached to a main group metal selected from aluminum, magnesium, calcium, zinc, gallium or boron.

Catalyst System Suitable for Use in Step A)

A catalyst system for use in step a) comprises at least two of the following components:
i) a metal catalyst or metal catalyst precursor comprising a metal from Group 3-10 of the IUPAC Periodic Table of elements that can undergo chain transfer polymerization with the main group metal hydrocarbyl functionality of the second type of olefin monomer or that via a chain shuttling agent can undergo chain transfer polymerization with the main group metal hydrocarbyl functionality of the second type of olefin monomer; and optionally at least one or more of
ii) a co-catalyst
iii) a scavenger Moreover, an additional main group metal hydrocarbyl chain transfer agent or a main group metal hydrocarbyl chain shuttling agent can be added as additional chain transfer agents and/or chain shuttling agents to insure reversible chain transfer polymerization.

The chain transfer agent functionality can also be a chain shuttling agent functionality.

In an embodiment, the catalyst system used in step A) further comprises an additional main group metal hydrocarbyl chain transfer agent or main group metal hydrocarbyl chain shuttling agent, selected from the group consisting of hydrocarbyl aluminum, hydrocarbyl magnesium, hydrocarbyl zinc, hydrocarbyl gallium, hydrocarbyl boron, hydrocarbyl calcium, aluminum hydride, magnesium hydride, zinc hydride, gallium hydride, boron hydride, calcium hydride and a combination thereof. An additional main group metal hydrocarbyl chain transfer agent can also be a chain shuttling agent.

The comonomer, which can also act as chain transfer agent, may be present in a molar ratio of between 10:1 to 10000:1, preferred 20:1 to 2000:1, further preferred between 100:1 to 500:1, compared to the catalyst.

The chain shuttling agent may be present in a molar ratio of between 1:1 to 1000:1, preferred 5:1 to 300:1, further preferred between 10:1 to 100:1, compared to the catalyst.

Chain shuttling agent as used in the present description means: a compound that is capable of reversibly interchanging hydrocarbyls with catalysts or other chain transfer agents. It is a metal compound comprising at least one ligand with a weak chemical bond. A chain shuttling agent can thus be a chain transfer agent.

Suitable catalysts and/or catalyst precursors are discussed in this section as well as suitable co-catalysts and scavengers, which are optional.

A catalyst for step A) can be used without co-catalyst, a catalyst precursor for step A) requires a co-catalyst to obtain the actual active catalyst.

In the present invention, the catalyst may thereby preferably be selected so that it might undergo chain transfer polymerization with the main group metal hydrocarbyl functionality of the second type of olefin monomer.

The catalyst may lead to chain transfer with a chain transfer agent, such as for example hydrogen or silanes.

One or more scavenger that can be used for example to scavenge impurities from the reaction medium prior and during the polymerization process, can be selected for example from the group consisting of: trialkyl aluminum, especially for example triisobutyl aluminum, MAO, DMAO, MMAO, SMAO.

Metal Catalyst and/or Catalyst Precursor Suitable for Step A)

In the section below several examples for metal catalysts or metal catalyst precursors, which may be used to prepare the metal catalyst according to the present invention, are specified. Metal catalysts that are suitable for use in step A) of the present invention may be obtained by reacting the metal catalyst precursors with a co-catalyst either prior to use in step A) or by in situ reaction with a co-catalyst.

According to the present invention, the metal catalyst has a metal center selected from a Group 3 metal, a Group 4 metal, a Group 5 metal, a Group 6 metal, a Group 7 metal, a Group 8 metal, a Group 9 metal or a Group 10 metal, preferably Y, Ti, Zr, Hf, V, Cr, Fe, Co, Ni, Pd.

Ziegler-Natta catalysts as reported in US2009/0048399, US2014/0350200, WO96/32427, WO01/23441, WO2007/134851, U.S. Pat. No. 4,978,648, EP1283 222A1, U.S. Pat. No. 5,556,820; U.S. Pat. No. 4,414,132; U.S. Pat. Nos. 5,106,806 and 5,077,357 may also be suitable to use as metal catalyst precursors in the present invention.

The metal catalysts or metal catalyst precursors may for example be a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethylsilyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

According to the invention, said catalyst precursor can be for example a so-called half-metallocene, or constrained geometry catalyst, even more preferably, C$_5$Me$_5$[(C$_6$H$_{11}$)$_3$P=N]TiCl$_2$, [Me$_2$Si(C$_5$Me$_4$)N(tBu)]TiCl$_2$, [C$_5$Me$_4$(CH$_2$CH$_2$NMe$_2$]TiCl$_2$. According to the invention, said catalyst can be for example a so-called post-metallocene, preferably [Et$_2$NC(N(2,6-iPr$_2$—C$_6$H$_3$)]TiCl$_3$ or [N-(2,6-di(1-methylethyl)phenyl)amido)(2-isopropylphenyl)(α-naphthalen-2-diyl(6-pyridin-2-diyl)methane)]hafnium dimethyl.

The metal catalyst or metal catalyst precursor can also be for example a preferably $C_s$ or $C_1$ symmetric compound according to the formula $(C_5R^8{}_4)R^9(C_{13}R^8{}_8)ML^1{}_n$, where $C_5R^8{}_4$ is an unsubstituted or substituted cyclopentadienyl, and $C_{13}R^{11}{}_8$ is an unsubstituted fluorenyl group or a substituted fluorenyl group; and the bridging $R^9$ group is selected from the group consisting of —Si(Me)$_2$-, —Si(Ph)$_2$-, —C(Me)$_2$- or —C(Ph)$_2$-, thus producing C$_1$- and C$_s$-symmetric metallocenes.

Non-limiting examples of zirconocene dichloride metal catalyst precursors suitable for use in the present invention include: bis(cyclopentadienyl) zirconium dichloride, bis(methyl-cyclopentadienyl) zirconium dichloride, bis(n-propyl-cyclopentadienyl) zirconium dichloride, bis(n-butyl-cyclopentadienyl) zirconium dichloride, bis(1,3-dimethyl-cyclopentadienyl) zirconium dichloride, bis(1,3-di-t-butyl-cyclopentadienyl) zirconium dichloride, bis(1,3-ditrimethylsilyl-cyclopentadienyl) zirconium dichloride, bis(1,2,4-trimethyl-cyclopentadienyl) zirconium dichloride, bis(1,2,3,4-tetramethylcyclopentadienyl) zirconium dichloride, bis(pentamethylcyclopentadienyl) zirconium dichloride, bis(indenyl) zirconium dichloride, bis(2-phenyl-indenyl) zirconium dichloride, bis(fluorenyl) zirconium dichloride, bis(tetrahydrofluorenyl) zirconium dichloride, dimethylsilyl-bis(cyclopentadienyl) zirconium dichloride, dimethylsilyl-bis(3-t-butyl-cyclopentadienyl) zirconium dichloride, dimethylsilyl-bis(3-trimethylsilyl-cyclopentadienyl) zirconium dichloride, dimethylsilyl-bis(tetrahydrofluorenyl) zirconium dichloride, dimethylsilyl-(1-indenyl)(cyclopentadienyl) zirconium dichloride, dimethylsilyl-(1-indenyl)(fluorenyl) zirconium dichloride, dimethylsilyl-(1-indenyl)(octahydrofluorenyl) zirconium dichloride, rac-dimethylsilyl-bis(2-methyl-3-t-butyl-cyclopentadienyl) zirconium dichloride, rac-dimethylsilyl-bis(1-indenyl) zirconium dichloride, rac-dimethylsilyl-bis(4,5,6,7-tetrahydro-1-indenyl) zirconium dichloride, rac-dimethylsilyl-bis(2-methyl-1-indenyl) zirconium dichloride, rac-dimethylsilyl-bis(4-phenyl-1-indenyl) zirconium dichloride, rac-dimethylsilyl-bis(2-methyl-4-phenyl-1-indenyl) zirconium dichloride, rac-ethylene-bis(1-indenyl) zirconium dichloride, rac-ethylene-bis(4,5,6,7-tetrahydro-1-indenyl) zirconium dichloride, rac-1,1,2,2-tetramethylsilanylene-bis(1-indenyl) zirconium dichloride, rac-1,1,2,2-tetramethylsilanylene-bis(4,5,6,7-tetrahydro-1-indenyl) zirconium dichloride, rac-ethylidene(1-indenyl)(2,3,4,5-tetramethyl-1-cyclopentadienyl) zirconium dichloride, rac-[1-(9-fluorenyl)-2-(2-methylbenzo[b]indeno[4,5-d]thiophen-1-yl)ethane]zirconium dichloride, dimethylsilyl bis(cyclopenta-phenanthren-3-ylidene) zirconium dichloride, dimethylsilyl bis(cyclopenta-phenanthren-1-ylidene) zirconium dichloride, dimethylsilyl bis(2-methyl-cyclopenta-phenanthren-1-ylidene) zirconium dichloride, dimethylsilyl bis(2-methyl-3-benz-inden-3-ylidene) zirconium dichloride, dimethylsilyl-bis[(3a,4,5,6,6a)-2,5-dimethyl-3-(2-methyl-phenyl)-6H-cyclopentathien-6-ylidene] zirconium dichloride, dimethylsilyl-(2,5-dimethyl-1-phenylcyclopenta[b]pyrrol-4(1H)-ylidene)(2-methyl-4-phenyl-1-indenyl) zirconium dichloride, bis(2-methyl-1-cyclopenta-phenanthren-1-yl)zirconium dichloride, [ortho-bis(4-phenyl-2-indenyl) benzene] zirconium dichloride, [ortho-bis(5-phenyl-2-indenyl) benzene] zirconium dichloride, [ortho-bis(2-indenyl)benzene] zirconium dichloride, [ortho-bis(1-methyl-2-indenyl)benzene] zirconium dichloride, [2,2'-(1,2-phenyldiyl)-1,1'dimethylsilyl-bis(indenyl)] zirconium dichloride, [2,2'-(1,2-phenyldiyl)-1,1'-(1,2-ethanediyl)-bis(indenyl)] zirconium dichloride, dimethylsilyl-(cyclopentadienyl)(9-fluorenyl) zirconium dichloride, diphenylsilyl-(cyclopentadienyl)(fluorenyl) zirconium dichloride, dimethylmethylene-(cyclopentadienyl)(fluorenyl) zirconium dichloride, diphenylmethylene-(cyclopentadienyl)(fluorenyl) zirconium dichloride, dimethylmethylene-(cyclopentadienyl)(octahydrofluorenyl) zirconium dichloride, diphenylmethylene-(cyclopentadienyl)(octahydrofluorenyl) zirconium dichloride, dimethylmethylene-(cyclopentadienyl)(2,7-di-t-butyl-fluorenyl) zirconium dichloride, diphenylmethylene-(cyclopentadienyl)(2,7-di-t-butyl-fluorenyl) zirconium dichloride, dimethylmethylene-(3-methyl-1-cyclopentadienyl)(fluorenyl) zirconium dichloride, diphenylmethylene-(3-methyl-1-cyclopentadienyl)(fluorenyl) zirconium dichloride, dimethylmethylene-(3-cyclohexyl-1-cyclopentadienyl)(fluorenyl) zirconium dichloride, diphenylmethylene-(3-cyclohexyl-1-cyclopentadienyl)(fluorenyl) zirconium dichloride, dimethylmethylene-(3-t-butyl-1-cyclopentadienyl)(fluorenyl) zirconium dichloride, diphenylmethylene-(3-t-butyl-1-cyclopentadienyl)(fluorenyl) zirconium dichloride, dimethylmethylene-(3-ademantyl-1-cyclopentadienyl)(fluorenyl) zirconium dichloride, diphenylmethylene-(3-ademantyl-1-cyclopentadienyl)(fluorenyl) zirconium dichloride, dimethylmethylene-(3-methyl-1-cyclopentadienyl)(2,7-di-t-butyl-fluorenyl) zirconium dichloride, diphenylmethylene-(3-methyl-1-cyclopentadienyl)(2,7-di-t-butyl-fluorenyl) zirconium dichloride, dimethylmethylene-(3-cyclohexyl-1-cyclopentadienyl)(2,7-di-t-butyl-fluorenyl) zirconium dichloride, diphenylmethylene-(3-cyclohexyl-1-cyclopentadienyl)(2,7-di-t-butyl-fluorenyl) zirconium dichloride, dimethylmethylene-(3-t-butyl-1-cyclopentadienyl)(2,7-di-t-butyl-fluorenyl) zirconium dichloride, diphenylmethylene-(3-t-butyl-1-cyclopentadienyl)(2,7-di-t-butyl-fluorenyl) zirconium dichloride, dimethylmethylene-(3-methyl-cyclopentadienyl)(octahydro-octamethyl-dibenzo-fluorenyl) zirconium dichloride, diphenylmethylene-(3-methyl-cyclopentadienyl)(octahydro-octamethyl-dibenzo-fluorenyl) zirconium dichloride, dimethylmethylene-(3-cyclohexyl-cyclopentadienyl)(octahydro-octamethyl-dibenzo-fluorenyl) zirconium dichloride, diphenylmethylene-(3-cyclohexyl-cyclopentadienyl)(octahydro-octamethyl-dibenzo-fluorenyl) zirconium dichloride, dimethylmethylene-(3-t-butyl-cyclopentadienyl)(octahydro-octamethyl-dibenzo-fluorenyl) zirconium dichloride, diphenylmethylene-(3-t-butyl-cyclopentadienyl)(octahydro-octamethyl-dibenzo-fluorenyl) zirconium dichloride, dimethylmethylene-(3-ademantyl-cyclopentadienyl)(octahydro-octamethyl-dibenzo-fluorenyl) zirconium dichloride, diphenylmethylene-(3-ademantyl-cyclopentadienyl)(octahydro-octamethyl-dibenzo-fluorenyl) zirconium dichloride.

In a preferred embodiment, the metal catalyst or metal catalyst precursor can be for example: [[2,2'-[[[2-(dimethylamino-κN)ethyl]imino-κN]bis(methylene)]bis[4,6-bis(1,1-dimethylethyl) phenolato-κO]] zirconium dibenzyl, (phenylmethyl)[[2,2'-[(propylimino-κN)bis(methylene)]bis[4,6-bis(1,1-dimethylethyl)phenolato-κO]] zirconium dibenzyl or (phenylmethyl)[[2,2'-[[[(2-pyridinyl-κN)methyl]imino-κN]bis(methylene)]bis[4,6-bis(1,1-dimethylethyl)phenolato-κO]] zirconium dibenzyl.

In a preferred embodiment, complexes as reported in WO 00/43426, WO 2004/081064, US 2014/0039138 A1, US 2014/0039139 A1 and US 2014/0039140 A1 are suitable to use as metal catalyst precursors for the processes of the present invention.

Compounds analogous to those listed above but where Zr has been replaced by Hf, so called hafnocenes, may also be used according to the as catalyst precursors present invention.

The metal catalysts or metal catalyst precursors for use in the present invention may also be from post-metallocene catalysts or catalyst precursors.

In a preferred embodiment, the metal catalyst or metal catalyst precursor may be: [HN(CH2CH2N-2,4,6-Me3-C6H2)2]Hf(CH2Ph)2 or bis[N,N'-(2,4,6-trimethylphenyl)amido)ethylenediamine]hafnium dibenzyl.

In a another preferred embodiment, the metal catalyst or metal catalyst precursor may be 2,6-diisopropylphenyl-N-(2-methyl-3-(octylimino)butan-2) hafnium trimethyl, 2,4,6-trimethylphenyl-N-(2-methyl-3-(octylimino)butan-2) hafnium trimethyl.

In a preferred embodiment, the metal catalyst or metal catalyst precursor may be [2,6-iPr2C6H3NC(2-iPr-C6H4)-2-(6-C5H6)]HfMe2-[N-(2,6-di(1-methylethyl)phenyl) amido)(2-isopropylphenyl) (□-naphthalen-2-diyl(6-pyridin-2-diyl)methane)]hafnium dimethyl.

Other non-limiting examples of metal catalyst precursors according to the present invention are: [N-(2,6-di(1-methylethyl)phenyl)amido)(o-tolyl)(α-naphthalen-2-diyl(6-pyridin-2-diyl)methane)] hafnium dimethyl, [N-(2,6-di(1-methylethyl)phenyl)amido)(o-tolyl)(α,α-naphthalen-2-diyl (6-pyridin-2-diyl)methane)] hafnium di(N,N-dimethylamido), [N-(2,6-di(l-methylethyl)phenyl)amido) (o-tolyl)(α,α-naphthalen-2-diyl(6-pyridin-2-diyl)methane)] hafnium dichloride, [N-(2,6-di(1-methylethyl)phenyl) amido)(phenanthren-5-yl)(α,α-naphthalen-2-diyl (6-pyridin-2-diyl)methane)] hafnium dimethyl, [N-(2,6-di(1-methylethyl)phenyl)amido)(phenanthren-5-yl)(α-naphthalen-2-diyl(6-pyridin 2-diyl)methane)] hafnium di(N, N-dimethylamido), [N-(2,6-di(l-methylethyl)phenyl)amido) (phenanthren-5-yl)(α-naphthalen-2-diyl(6-pyridin-2-diyl) methane)] hafnium dichloride. Other non-limiting examples include the family of pyridyl diamide metal dichloride complexes such as: [N-[2,6-bis(1-methylethyl)phenyl]-6-[2-[phenyl(phenylamino-κN)methyl]phenyl]-2-pyridinemethanaminato(2-)-κN1,κN2]hafnium dichloride, [N-[2,6-bis(1-methylethyl)phenyl]-6-[2-[(phenylamino-κN)methyl]-1-naphthalenyl]-2-pyridinemethanaminato(2-)-κN1,κN2] hafnium dichloride, [N-[2,6-bis(1-methylethyl)phenyl]-α-[2-(1-methylethyl)phenyl]-6-[2-[(phenylamino-κN)methyl] phenyl]-2-pyridinemethanaminato(2-)-κN1,κN2] hafnium dichloride, [N-(2,6-diethylphenyl)-6-[2-[phenyl(phenylamino-κN)methyl]-1-naphthalenyl]-2-pyridinemethanaminato(2-)-κN1,κN2]zirconium dichloride, [4-methyl-2-[[2-phenyl-1-(2-pyridinyl-κN)ethyl]amino-κN]phenolato (2-)-κO]bis(phenylmethyl)hafnium bis(phenylmethyl), [2-(1,1-dimethylethyl)-4-methyl-6-[[2-phenyl-1-(2-pyridinyl-κN)ethyl]amino-κN]phenolato(2-)-κO] hafnium bis (phenylmethyl), [2-(1,1-dimethylethyl)-4-methyl-6-[[phenyl(2-pyridinyl-κN)methyl]amino-κN]phenolato(2-)-κO]hafnium bis(phenylmethyl).

Non-limiting examples of titanium dichloride metal catalyst precursors suitable for use in the present invention include: cyclopentadienyl(P,P,P-tri-t-butylphosphine imidato) titanium dichloride, pentafluorophenylcyclopentadienyl(P,P,P-tri-t-butylphosphine imidato) titanium dichloride, pentamethylcyclopentadienyl(P,P,P-tri-t-butylphosphine imidato) titanium dichloride, 1,2,3,4-tetraphenyl-cyclopentadienyl(P,P,P-tri-t-butylphosphine imidato) titanium dichloride, cyclopentadienyl(P,P,P-tricyclohexylphosphine imidato) titanium dichloride, pentafluorophenyl cyclopentadienyl(P,P,P-tricyclohexylphosphine imidato) titanium dichloride, pentamethylcyclopentadienyl(P,P,P-tricyclohexylphosphine imidato) titanium dichloride, 1,2,3,4-tetraphenyl-cyclopentadienyl(P,P,P-tricyclohexylphosphine imidato) titanium dichloride, pentamethylcyclopentadienyl (P,P-dicyclohexyl-P-(phenylmethyl)phosphine imidato) titanium dichloride, cyclopentadienyl(2,6-di-t-butyl-4-methylphenoxy) titanium dichloride, pentafluorophenylcyclopentadienyl(2,6-di-t-butyl-4-methylphenoxy) titanium dichloride, pentamethylcyclopentadienyl(2,6-di-t-butyl-4-methylphenoxy) titanium dichloride, 1,2,3-trimethyl-cyclopentadienyl(2,6-bis(1-methylethyl) phenolato) titanium dichloride, [(3a,4,5,6,6a-η)-2,3,4,5,6-pentamethyl-3aH-cyclopenta[b]thien-3a-yl](2,6-bis(1-methylethyl)phenolato) titanium dichloride, pentamethylcyclopentadienyl(N,N'-bis(1-methylethyl)ethanimidamidato) titanium dichloride, pentamethylcyclopentadienyl(N,N'-dicyclohexylbenzenecarboximidamidato) titanium dichloride, pentamethylcyclopentadienyl(N,N'-bis(1-methylethyl)benzenecarboximidamidato) titanium dichloride, cyclopentadienyl(1,3-bis(1,1-dimethylethyl)-2-imidazolidiniminato) titanium dichloride, cyclopentadienyl (1,3-dicyclohexyl-2-imidazolidiniminato) titanium dichloride, cyclopentadienyl(1,3-bis[2,6-bis(1-methylethyl) phenyl]-2-imidazolidiniminato) titanium dichloride, pentafluorophenylcyclopentadienyl(1,3-bis(1,1-dimethylethyl)-2-imidazolidiniminato) titanium dichloride, pentafluorophenylcyclopentadienyl(1,3-dicyclohexyl-2-imidazolidiniminato) titanium dichloride, pentafluorophenylcyclopentadienyl(1,3-bis[2,6-bis(1-methylethyl)phenyl]-2-imidazolidiniminato) titanium dichloride, pentamethylcyclopentadienyl(di-t-butylketimino) titanium dichloride, pentamethylcyclopentadienyl(2,2,4,4-tetramethyl-3-pentaniminato) titanium dichloride, [(3a,4,5,6,6a-η)-2,4,5,6-tetramethyl-3aH-cyclopenta [b]thien-3a-yl](2,2,4,4-tetramethyl-3-pentaniminato) titanium dichloride, cyclopentadienyl(N,N-bis(1-methylethyl)benzenecarboximidamidato) titanium dichloride, pentafluorophenylcyclopentadienyl(N,N-bis(1-methylethyl) benzenecarboximidamidato) titanium dichloride, pentamethylcyclopentadienyl(N,N-bis(1-methylethyl)benzenecarboximidamidato) titanium dichloride, cyclopentadienyl(2,6-difluoro-N,N-bis(1-methylethyl)benzenecarboximidamidato) titanium dichloride, pentafluorophenylcyclopentadienyl(2,6-difluoro-N,N-bis(1-methylethyl)benzenecarboximidamidato) titanium dichloride, pentamethylcyclopentadienyl(2,6-difluoro-N,N-bis(1-methylethyl)benzenecarboximidamidato) titanium dichloride, cyclopentadienyl(N,N-dicyclohexyl-2,6-difluorobenzenecarboximidamidato) titanium dichloride, pentafluorophenylcyclopentadienyl(N,N-dicyclohexyl-2,6-difluorobenzenecarboximidamidato) titanium dichloride, pentamethylcyclopentadienyl(N,N-dicyclohexyl-2,6-difluorobenzenecarboximidamidato) titanium dichloride, cyclopentadienyl(N,N,N',N'-tetramethylguanidinato) titanium dichloride, pentafluorophenylcyclopentadienyl(N,N,N',N'-tetramethylguanidinato) titanium dichloride, pentamethylcyclopentadienyl(N,N,N',N'-tetramethylguanidinato) titanium dichloride, pentamethylcyclopentadienyl(1-(imino) phenylmethyl)piperidinato) titanium dichloride, pentamethylcyclopentadienyl chromium dichloride tetrahydrofuran complex.

Non-limiting examples of titanium (IV) dichloride metal catalyst suitable for use in the present invention are: (N-t-butylamido)(dimethyl)(tetramethylcyclopentadienyl)silane titanium dichloride, (N phenylamido)(dimethyl)(tetramethylcyclopentadienyl) silane titanium dichloride, (N sec-butylamido)(dimethyl)(tetramethylcyclopentadienyl)silane titanium dichloride, (N sec-dodecylamido) (dimethyl) (fluorenyl)silane titanium dichloride, (3 phenylcyclopentadien-1-yl) dimethyl(t-butylamido) silane titanium dichloride, (3 (pyrrol-1-yl)cyclopentadien-1-yl) dimethyl(t-butylamido)silane titanium dichloride, (3,4-diphenylcyclopentadien-1-yl)dimethyl(t-butylamido) silane titanium dichloride, 3 (3-N,N-dimethylamino)phenyl) cyclopentadien-1-yl)dimethyl(t-butylamido) silane titanium dichloride, (P-t-butylphospho)(dimethyl) (tetramethylcyclopentadienyl) silane titanium dichloride. Other examples are the metal catalyst precursor cited in the list directly above wherein Ln is dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl.

Suitable metal catalyst precursors can be also the trivalent transition metal as those described in WO 9319104 (for example see especially example 1, page 13, line 15).

Suitable metal catalyst precursors can be also the trivalent transition metal as [C5Me4CH2CH2N(n-Bu)2]TiCl2 described in WO 9613529 (for example see especially example III, page 20, line 10-13) or [C5H(iPr)3CH2CH2NMe2]TiCl2 described in WO 97142232 and WO 9742236 (for example see especially example 1, page 26, line 14).

In an embodiment, the metal catalyst precursor is [C5H4CH2CH2NMe2]TiCl2;

In an embodiment, the metal catalyst or metal catalyst precursor may also be [C5Me4CH2CH2NMe2]TiCl2, [C5H4CH2CH2NiPr2]TiCl2, [C5Me4CH2CH2NiPr2]TiCl2, [C5H4C9H6N]TiCl2, [C5H4CH2CH2NMe2]CrCl2, [C5Me4CH2CH2NMe2]CrCl2; [C5H4CH2CH2NiPr2]CrCl2, [C5Me4CH2CH2NiPr2]CrCl2 or [C5H4C9H6N]CrCl2.

A non-limiting list of examples of metal catalyst precursors that would be suitable according to the present invention are: (N,N dimethylamino)methyl-tetramethylcyclopentadienyl titanium dichloride, (N,N dimethylamino)ethyl-tetramethylcyclopentadienyl titanium dichloride, (N,N dimethylamino)propyl-tetramethylcyclopentadienyl titanium dichloride, (N,N dibutylamino)ethyl-tetramethylcyclopentadienyl titanium dichloride, (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenylphosphino)ethyl-tetramethylcyclopentadienyl titanium dichloride, (diphenylphosphino)methyldimethylsilyl-tetramethylcyclopentadienyl titanium dichloride. Other examples are the catalysts cited in the list directly above wherein Ln wherein the chloride can be replaced with bromide, hydride, methyl, benzyl, phenyl, allyl, (2-N,N-dimethylaminomethyl)phenyl, (2-N,N-dimethylamino)benzyl, 2,6-dimethoxyphenyl, pentafluorophenyl, and/or wherein the metal is trivalent titanium or trivalent chromium.

In a preferred embodiment, the catalyst precursor is: [2-(2,4,6-iPr3-C6H2)-6-(2,4,6-iPr3-C6H2)-C5H3N]Ti(CH2Ph)3 or [Et2NC(N-2,6-iPr2-C6H3)2]TiCl3

Other non-limiting examples of metal catalyst precursors according to the present invention are: {N',N'''-bis[2,6-di(1-methylethyl)phenyl]-N,N-diethylguanidinato} titanium trichloride, {N',N'''bis[2,6-di(1-methylethyl)phenyl]-N-methyl-N-cyclohexylguanidinato} titanium trichloride, {N',N'''-bis[2,6-di(1-methylethyl)phenyl]-N,N-pentamethyleneguanidinato} titanium trichloride, {N',N'''-bis[2,6-di(methyl)phenyl]-sec-butyl-aminidinato} titanium trichloride, {N-trimethylsilyl,N'—(N'',N''-dimethylaminomethyl)benzamidinato} titanium dichloride THF complex, {N-trimethylsilyl,N'—(N'',N''-dimethylaminomethyl)benzamidinato} vanadium dichloride THF complex, {N,N'-bis(trimethylsilyl)benzamidinato} titanium dichloride THF complex, {N,N'-bis(trimethylsilyl)benzamidinato} vanadium dichloride THF complex.

In a preferred embodiment, the catalyst precursor can be for example: [C5H3N{CMe=N(2,6-iPr2C6H3)}2]FeCl2, [2,4-(t-Bu)2,-6-(CH=NC6F5)C6H2O]2TiCl2 or bis[2-(1,1-dimethylethyl)-6-[(pentafluorophenylimino)methyl] phenolato] titanium dichloride. Other non-limiting examples of metal catalyst precursors according to the present invention can be for example: bis[2-[(2-pyridinylimino)methyl]phenolato] titanium dichloride, bis[2-(1,1-dimethylethyl)-6-[(phenylimino)methyl]phenolato] titanium dichloride, bis[2-(1,1-dimethylethyl)-6-[(1-naphthalenylimino)methyl]phenolato] titanium dichloride, bis[3-[(phenylimino)methyl][1,1'-biphenyl]-2-phenolato] titanium dichloride, bis[2-(1,1-dimethylethyl)-4-methoxy-6-[(phenylimino)methyl]phenolato] titanium dichloride, bis[2,4-bis(1-methyl-1-phenylethyl)-6-[(phenylimino)methyl]phenolato] titanium dichloride, bis[2,4-bis(1,1-dimethylpropyl)-6-[(phenylimino)methyl]phenolato] titanium dichloride, bis[3-(1,1-dimethylethyl)-5-[(phenylimino)methyl][1,1'-biphenyl]-4-phenolato] titanium dichloride, bis[2-[(cyclohexylimino)methyl]-6-(1,1-dimethylethyl)phenolato] titanium dichloride, bis[2-(1,1-dimethylethyl)-6-[[[2-(1-methylethyl)phenyl]imino]methyl]phenolato] titanium dichloride, bis[2-(1,1-dimethylethyl)-6-[(pentafluorophenylimino)ethyl]phenolato] titanium dichloride, bis[2-(1,1-dimethylethyl)-6-[(pentafluorophenylimino)propyl]phenolato] titanium dichloride, bis[2,4-bis(1,1-dimethylethyl)-6-[1-(phenylimino)ethyl]phenolato] titanium dichloride, bis[2,4-bis(1,1-dimethylethyl)-6-[1-(phenylimino)propyl]phenolato] titanium dichloride, bis[2,4-bis(1,1-dimethylethyl)-6-[phenyl(phenylimino)methyl]phenolato] titanium dichloride. Other examples are the metal catalyst precursor cited in the list directly above wherein the dichloride can be replaced with dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

In a preferred embodiment, the catalyst precursor can be: [2-[[[2-[[[3,5-bis(1,1-dimethylethyl)-2-(hydroxy-κO)phenyl]methyl]amino-κN]ethyl]methylamino-κN]methyl]-4,6-bis(1,1-dimethylethyl)phenolato(2-)-κO] titanium bis(phenylmethyl), [2,4-dichloro-6-[[[2-[[[3,5-dichloro-2-(hydroxy-κO)phenyl]methyl]amino-κN]ethyl]methylamino-κN]methyl]phenolato(2-)-κO] titanium bis(phenylmethyl), [2-[[[[1-[[2-(hydroxy-κO)-3,5-diiodophenyl]methyl]-2-pyrrolidinyl-κN]methyl]amino-κN]methyl]-4-methyl-6-tricyclo[3.3.1.13,7]dec-1-ylphenolato(2-)-κO] titanium bis(phenylmethyl), [2-[[[2-[[[[2-(hydroxy-κO)-3,5-bis(1-methyl-1-phenylethyl)phenyl]methyl]methylamino-κN]methyl]phenyl]methylamino-κN]methyl]-4,6-bis(1-methyl-1-phenylethyl)phenolato(2-)-κO] titanium bis(phenylmethyl), [2,4-dichloro-6-[[[2-[[[[3,5-dichloro-2-(hydroxy-κO)phenyl]methyl]amino-κN]methyl]phenyl]amino-κN]methyl]phenolato(2-)-κO] titanium bis(phenylmethyl). Other examples are the metal catalyst precursor cited in the list directly above wherein bis(phenylmethyl) can be replaced with dichloride, dimethyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

A non-limiting list of examples of chromium catalysts that would be suitable for use in to the present invention are: (N-t-butylamido)(dimethyl)(tetramethylcyclopentadienyl) silane chromium bis(trimethylsilyl)methyl, (N-phenylamido)(dimethyl)(tetramethylcyclopentadienyl) silane chromium bis(trimethyl)methyl, (N-sec-butylamido)(dimethyl) (tetramethylcyclopentadienyl)silane chromium bis(t-rimethylsilyl)methyl, (N-sec-dodecylamido)(dimethyl) (fluorenyl)silane chromium hydride triphenylphosphine, (P-t-butylphospho)(dimethyl)(tetramethylcyclopentadienyl) silane chromium bis(trimethylsilyl)methyl. Other examples are the catalysts cited in the list directly above wherein L1 is hydride, methyl, benzyl, phenyl, allyl, (2-N,N-dimethylaminomethyl)phenyl, (2-N,N-dimethylamino)benzyl; in other words chromium methyl, chromium benzyl, chromium allyl, chromium (2-N,N-dimethylamino)benzyl; and/or wherein the metal is trivalent yttrium or samarium; Other examples are metal catalyst precursors as cited in the list directly above wherein Ln is chloride, bromide, hydride, methyl, benzyl, phenyl, allyl, (2-N,N-dimethylaminomethyl)phenyl, (2-N,N-dimethylamino)benzyl and/or wherein the metal is trivalent titanium or trivalent chromium.

Non-limiting examples of metal catalyst precursors according to the present invention are: N,N'-1,2-acenaphthylenediylidenebis(2,6-bis(1-methylethyl)benzenamine) nickel dibromide, N,N'-1,2-ethanediylidenebis(2,6-dimethylbenzenamine) nickel dibromide, N,N'-1,2-ethanediylidenebis(2,6-bis(1-methyl-ethyl)benzenamine) nickel dibromide, N,N'-1,2-acenaphthylenediylidenebis(2,6-dimethylbenzenamine) nickel dibromide, N,N'-1,2-acenaphthylenediylidenebis(2,6-bis(1-methylethyl) benzenamine) nickel dibromide, N,N'-1,2-acenaphthylenediylidenebis(1,1'-biphenyl)-2-amine nickel dibromide. Other examples are the catalysts cited in the list directly above wherein bromide can be replaced with chloride, hydride, methyl, benzyl and/or the metal can be palladium.

Further non-limiting examples of metal catalyst precursors according to the present invention are: [2-[[[2,6-bis(1-methylethyl)phenyl]imino-κN]methyl]-6-(1,1-dimethylethyl)phenolato-κO] nickel phenyl(triphenylphosphine), [2-[[[2,6-bis(1-methylethyl)phenyl]imino-κN]methyl]-6-(1,1-dimethylethyl)phenolato-κO] nickel phenyl (triphenylphosphine), [2-[[[2,6-bis(1-methylethyl)phenyl]imino-κN]methyl]phenolato-κO] nickel phenyl (triphenylphosphine)-, [3-[[[2,6-bis(1-methylethyl)phenyl]imino-κN]methyl][1,1'-biphenyl]-2-olato-κO] nickel phenyl (triphenylphosphine)-, [2-[[[2,6-bis(1-methylethyl)phenyl]imino-κN]methyl]-4-methoxyphenolato-κO] nickel phenyl (triphenylphosphine), [2-[[[2,6-bis(1-methylethyl)phenyl]imino-κN]methyl]-4-nitrophenolato-κO] nickel phenyl (triphenylphosphine), [2,4-diiodo-6-[[[3,3",5,5"-tetrakis(trifluoromethyl)[1,1':3',1"-terphenyl]-2'-yl]imino-κN]methyl]phenolato-κO] nickel methyl[[3,3',3"-(phosphinidyne-κP)tris[benzenesulfonato]]] trisodium; [2,4-diiodo-6-[[[3,3",5,5"-tetrakis(trifluoromethyl)[1,1':3',1"-terphenyl]-2'-yl]imino-κN]methyl]phenolato-κO] nickel methyl[[3,3'-(phenylphosphinidene-κP)bis[benzenesulfonato]]]-disodium.

Co-Catalyst Suitable for Step A)

A co-catalyst can be used when a metal catalyst precursor is used. A co-catalyst may thereby be an alkylating agent and/or reducing agent and/or cationization agent for the catalyst precursor and/or a scavenger. The function of this co-catalyst is to activate the metal catalyst precursor. Co-catalyst may be selected for example from aluminum alkyls and aluminum alkyl halides, such as for example triethyl aluminum (TEA) or diethyl aluminum chloride (DEAC). Co-catalysts may be selected for example from the group consisting of MAO, DMAO, MMAO, SMAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. B(R')$_y$ wherein R' is a fluorinated aryl and y is 3 or 4, respectively). Examples of a fluorinated borane is B(C$_6$F$_5$)$_3$ and of fluorinated borates are [X]$^+$[B(C$_6$F$_5$)$_4$]$^-$ (e.g. X=Ph$_3$C, C$_6$H$_5$N(H)Me$_2$).

Methylaluminoxane or MAO as used in the present description may mean: a compound derived from the partial hydrolysis of trimethyl aluminum that serves as a co-catalyst for catalytic olefin polymerization.

Supported methylaluminoxane or SMAO as used in the present description may mean: a methylaluminoxane bound to a solid support.

Depleted methylaluminoxane or DMAO as used in the present description may mean: a methylaluminoxane from which the free trimethyl aluminum has been removed.

Modified methylaluminoxane or MMAO as used in the present description may mean: modified methylaluminoxane, viz. the product obtained after partial hydrolysis of trimethyl aluminum plus another trialkyl aluminum such as tri(isobutyl) aluminum or tri-n-octyl aluminum.

Fluorinated aryl borates or fluorinated aryl boranes as used in the present description may mean: a borate compound having three or four fluorinated (preferably perfluorinated) aryl ligands or a borane compound having three fluorinated (preferably perfluorinated) aryl ligands.

For example, the co-catalyst can be an organometallic compound. The metal of the organometallic compound can be selected from Group 1, 2, 12 or 13 of the IUPAC Periodic Table of Elements. Preferably, the co-catalyst is an organoaluminum compound, more preferably an aluminoxane, said aluminoxane being generated by the reaction of a trialkyl aluminum compound with water to partially hydrolyze said aluminoxane. For example, trimethyl aluminum can react with water (partial hydrolysis) to form methylaluminoxane (MAO). MAO has the general formula (Al(CH$_3$)$_{3-n}$O$_{0.5n}$)$_x$·(AlMe$_3$)$_y$ having an aluminum oxide framework with methyl groups on the aluminum atoms.

MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Neutral Lewis acid modified polymeric or oligomeric aluminoxanes may also be used, such as alkylaluminoxanes modified by addition of a C1-30 hydrocarbyl substituted Group 13 compound, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

Other examples of polymeric or oligomeric aluminoxanes are tri(isobutyl) aluminum- or tri(n-octyl) aluminum-modified methylaluminoxane, generally referred to as modified methylaluminoxane, or MMAO. In the present invention, MAO, DMAO, SMAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., Chem. Rev. 2000, (100), 1391. Suitable alkylating agents are trialkyl aluminum compounds, preferably TIBA. Suitable cation forming agents for use herein include (i) neutral Lewis acids, such as C1-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type $[C]^+[A]^-$ where "C" is a cationic group such as ammonium, phosphonium, oxonium, carbonium, silylium or sulfonium groups and $[A]^-$ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported co-catalyst may also be used, for example using silica supported MAO (SMAO) as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Copolymerization of an Olefin and an Olefin Comprising a Main Group Metal Hydrocarbyl Chain Transfer Agent Functionality Step A) is preferably carried out in an inert atmosphere.

Copolymerization of the olefins can for example be carried out in the gas phase below the melting point of the polymer. Copolymerization can also be carried out in the slurry phase below the melting point of the polymer. Moreover, copolymerization can be carried out in solution at temperatures above the melting point of the polymer product.

It is known to continuously polymerize one or more olefins, such as ethylene or propylene, in solution or in slurry, e.g. in a continuous (multi) CSTR or (multi) loop reactor, in the gas-phase in a reactor with a fluidized or mechanically stirred bed or in a combination of these different reactors, in the presence of a catalyst based on a compound of a transition metal belonging to Groups 3 to 10 of the Periodic Table of the Elements.

Slurry phase polymerizations are typically carried out at temperatures in the range 50-125° C. and at pressures in the range 1-50 bar.

The present invention may also be carried out in a solution polymerization process. Typically, in the solution process, the monomer and polymer are dissolved in an inert solvent.

Although a single reactor can be used, multiple reactors provide a narrower residence time distribution and therefore a better control of molecular weight distribution.

According to the present invention, content of comonomer can represent for example at between 0.01 mol-% and 70 mol-%, preferably between 0.05 mol-% and 30 mol-%, preferably between 0.06 mol-% and 20 mol-%, preferably between 0.07 mol-% and 15 mol-%, preferably between 0.08 mol-% and 10 mol-%, preferably between 0.09 mol-% and 8 mol-%, preferably between 0.1 mol-% and 7 mol-%, further preferred between 0.5 mol-% and 5 mol-%, further preferred between 1 mol-% and 4 mol-%, further preferred between 2 mol-% and 3 mol-% and/or at least 0.001 mol-%, further preferred least 0.01 mol-%, preferably 0.1 mol-%, further preferred 0.5 mol-%, further preferred at least 1 mol-%, preferred at least 10 mol-%, further preferred at least 15 mol-%, further preferred at least 20 mol-%, further preferred at least 30 mol-%, further preferred at least 40 mol-%, further preferred at least 50 mol-%, further preferred at least 60 mol-% of the obtained polymers.

Step B) Oxidation

A second step of the process according to the present invention can be step B) and relates to contacting the polyolefin obtained in step A) with at least one oxidizing agent or safe oxidizing agent to obtain to obtain a polyolefin having one or more pending oxidized and/or polar and/or nucleophilic functionalities. Step B) can, however, be optional, especially for example if a halogen or a halogen-containing compound is used as a quenching agent.

Typically the functionalization consists of an oxidation step followed by a subsequent quenching step to release the main group metal from the oxidized polyolefin chain (this can be for example by a hydrolysis step in water). In this way, branched polyolefins bearing pending polar functionalities and/or branch functionalities, such as especially for example alcohol functionalities or carboxylic acid functionalities, can be obtained.

A quenching agent as used in the present description may mean: an agent to remove the main group metal from the polyolefin having one or multiple main group metal-functionalized oxidized branches to obtain end-group functionalities and/or pending functionalities.

As safe oxidizing agent in step B) the following may for example be used: $CO$, $CO_2$, $CS_2$, $COS$, $R^2NCO$, $R^2NCS$, $R^2NCNR^3$, $CH_2=C(R^2)C(=O)OR^3$, $CH_2=C(R^2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R^4C=NR^2$, carbodiimides, $R^2C(=O)R^3$, $ClC(=O)OR^2$ and $SO_3$, preferably $N_2O$, $CO_2$ and $SO_3$.

In an embodiment, an oxidizing agent or safe oxidizing agent used in the present invention can be dried. A dried safe oxidizing agent according to the invention can thereby preferably comprise less than 100 ppm of water, preferably less than 50 ppm of water, further preferred less than 20 ppm of water, even more preferred less than 10 ppm of water, even more preferred less than 5 ppm of water, even more preferred less than 3 ppm of water. This can contribute to improve oxidation yield.

With respect to CO, after quenching for example an aldehyde or ketone functionalized branched polyolefin (Pol-C(=O)H or Pol-C(=O)$R^1$) can be obtained.

With respect to $R^2NC$, after quenching for example either (Pol-C(=$NR^2$)H or Pol-C(=$NR^2$)$R^1$) can be obtained.

With respect to $CO_2$, after quenching for example either an acid or ester functionalized branched polyolefin (Pol-C(=O)OH or Pol-C(=O)$OR^1$) can be obtained.

With respect to $CS_2$, after quenching for example either Pol-C(=S)SH or Pol-C(=S)$SR^1$ can be obtained.

With respect to COS, after quenching for example either Pol-C(=O)SH, Pol-C(=S)OH, Pol-C(=O)$SR^1$ or Pol-C(=S)$OR^1$) can be obtained.

With respect to $R^2NCO$, after quenching for example amide or imino functionalized branched polyolefin (Pol-C(=O)$NR^2$H, Pol-C(=$NR^2$)OH, Pol-C(=O)$NR^2R^1$ or Pol-C(=$NR^2$)$OR^1$) can be obtained.

With respect to $R^2NCS$, after quenching for example thiomidic acid, thioamide or thioamidate (ester) functionalized branched polyolefin (Pol-C(=S)NR$^2$H, Pol-C(=NR$^2$)SH, Pol-C(=S)NR$^2$R$^1$ or Pol-C(=NR$^2$)SR$^1$) can be obtained.

With respect to $R^2NCNR^3$, after quenching for example an amide functionalized branched polyolefin (Pol-C(=NR$^2$)NR$^3$R$^1$) can be obtained.

With respect to CH$_2$=CR$^2$COOR$^3$, after quenching for example either a hemiacetal or acetal functionalized branched polyolefin (Pol-CH$_2$CR$^2$=C(OR$^3$)OH or Pol-CH$_2$CR$^2$=C(OR$^3$)OR$^1$) can be obtained.

With respect to CH$_2$=C(R$^2$)C(=O)NR$^3$R$^4$, after quenching for example a functionalized branched polyolefin of formula Pol-CH$_2$—C(R$^2$)=C(NR$^3$R$^4$)OR$^1$ can be obtained.

With respect to CH$_2$=C(R$^2$)P(=O)(OR$^3$)OR$^4$, after quenching for example a functionalized branched polyolefin of formula Pol-CH$_2$—C(R$^2$)=P(OR$^3$)(OR$^4$)OR$^1$ can be obtained.

With respect to N$_2$O, the metal carbon bond is cleaved and oxygen is inserted to form a Pol-O-M. After quenching for example either an alcohol or an ether functionalized branched polyolefin (Pol-OH or Pol-OR$^1$) can be obtained.

With respect to R$^2$CN, after quenching for example either a substituted or non-substituted imine functionalized branched polyolefin (Pol-C(R$^2$)=NR$^1$ or Pol-C(R$^2$)=NH) can be obtained.

With respect to epoxide, after quenching for example an alcohol, ether or ester functionalized branched polyolefin (Pol-C(R$^2$)R$^3$C(R$^4$)R$^5$OH, Pol-C(R$^2$)R$^3$C(R$^4$)R$^5$OR$^1$ or Pol-C(R$^2$)R$^3$C(R$^4$)R$^5$OC(=O)R$^1$) can be obtained.

With respect to aziridine, after quenching for example an amine or amide functionalized branched polyolefin (Pol-C(R$^2$)R$^3$C(R$^4$)R$^5$NR$^6$H, Pol-C(R$^2$)R$^3$C(R$^4$)R$^5$NR$^6$R$^1$ or Pol-C(R$^2$)R$^3$C(R$^4$)R$^5$NR$^6$C(=O)R$^1$) can be obtained.

With respect to cyclic anhydride, after quenching for example either a anhydride-acid or anhydride-ester functionalized branched polyolefin (Pol-C(=O)—R$^2$—C(=O)OH or Pol-C(=O)—R$^2$—C(=O)OR) can be obtained.

With respect to imine, after quenching for example an amine functionalized branched polyolefin (Pol-CR$^3$R$^4$NR$^2$H or Pol-CR$^3$R$^4$NR$^2$R$^1$) can be obtained.

With respect to SO$_3$, the metal carbon bond is cleaved and the oxidizing agent is inserted to form a Pol-S(=O)$_2$O-M. After quenching for example either a sulfonic acid or sulfonic acid ester functionalized branched polyolefin (Pol-S(=O)$_2$OH or Pol-S(=O)$_2$OR$^1$) can be obtained.

With respect to a ketone or aldehyde, the metal carbon bond is cleaved and the oxidizing agent is inserted to form a Pol-C(R$^2$)(R$^3$)O-M. After quenching for example an alcohol, ether or ester functionalized branched polyolefin (Pol-CR$^2$R$^3$OH, Pol-CR$^2$R$^3$OR$^1$ or Pol-CR$^2$R$^3$OC(=O)R$^1$) can be obtained.

R$^1$, R$^2$, R$^3$, R$^4$, R$^5$, R$^6$ are each independently selected from the group consisting of H, SiR$_3^7$, SnR$_3^7$ or a C1-C16 hydrocarbyl, preferably a C1-C4 hydrocarbyl, where R$^7$ is selected from the group consisting of C1-C16 hydrocarbyl.

The oxidizing agent can be for example gaseous, whereby the oxidation step can optionally be carried out for example at a pressure between 0.01 and 80 bar, preferably between 1 and 20 bar, further preferred between 2 and 10 bar. In an embodiment, the oxidation step can be carried out for example at a temperature of between 0° C. and 250° C.

In an embodiment, the oxidation step can be for example carried out for a time period of between 0.5 minutes and 150 minutes, more preferably between 1 minutes and 120 minutes, further preferred between 30 minutes and 60 minutes depending on the reaction temperature and the oxidizing agent.

Step C) Quenching

During step C) a quenching agent can be used to remove the main group metal from the branches to obtain polar functionalities. Said quenching step can preferably be carried out using a hydrolyzing agent or another non-protic metal-substituting agent, which can for example remove the metal to obtain a polar functionality. Step C) can be optional, especially for example if a ketone, an ether or a thioether function is introduced in Step B).

In an embodiment, said quenching agent is a hydrolyzing agent, which is a protic molecule, e.g. water or an alcohol, especially for example such as (acidified) methanol or ethanol, preferably water.

This leads to a method for preparing polyolefins (Pols), such as polyethylene (PE, HDPE, LLPDE), polypropylene (PP) and many others bearing diverse end-group functionalities including, but not limited to, for example a halogen functionality (e.g. Pol-Cl), ketone functionality (Pol-C(=O)R), ketamine functionality (Pol-C(=NR$^2$)R$^1$), carboxylic acid functionality (Pol-COOH), a thiolic acid functionality (Pol-C(=O)SH, a thionic acid functionality (Pol-C(=S)OH), a dithio acid functionality (Pol-C(=S)SH), an alcohol functionality (Pol-OH), an ether functionality (Pol-OR$^1$), an amine functionality (Pol-N(R$^2$)R$^1$), a thiol functionality (Pol-SH), an amidine functionality (Pol-C(=NR$^2$)N(R$^3$)R$^1$), an amide functionality (Pol-C(=O)N(R$^2$)R$^1$), an ester functionality (Pol-C(=O)OR), a thioester functionality (Pol-C(=O)SR$^1$), a dithioester functionality (Pol-C(=S)SR$^1$) a hemiacetal (Pol-CH$_2$CR$^2$=C(OR$^3$)—OH) or an acetal functionality (Pol-CH$_2$CR$^2$=C(OR$^3$)—OR$^1$).

Pol as used in the present description means: polyolefin.

Content of polar functionalities, can represent for example at between 0.01 mol-% and 60 mol-%, preferably between 0.05 mol-% and 25 mol-%, preferably between 0.07 mol-% and 15 mol-%, preferably between 0.08 mol-% and 8 mol-%, preferably between 0.01 mol-% and 7 mol-%, preferably between 0.1 mol-% and 5 mol-%, further preferred between 0.5 mol-% and 4.5 mol-%, further preferred between 1 mol-% and 4 mol-%, further preferred between 2 mol-% and 3 mol-%, further preferred between 1.5 mol-% and 2.5 mol-% and/or at least 0.001 mol-%, further preferred least 0.01 mol-%, preferably 0.1 mol-%, further preferred 0.5 mol-%, further preferred at least 1 mol-%, preferred at least 10 mol-%, further preferred at least 15 mol-%, further preferred at least 20 mol-%, further preferred at least 30 mol-%, further preferred at least 40 mol-%, further preferred at least 50 mol-%, further preferred at least 60 mol-% of the obtained polymers.

A polymer with a relatively low content of polar functionalities and/or of comonomer can thereby for example ensure and be used to provide a good miscibility with polyolefins, while still contributing to improve compatibility with more polar materials. On the other hand, a relatively high content of polar functionalities and/or of comonomer can for example contribute to improve compatibility with polar materials, other materials and/or barrier properties.

In an embodiment, branched polyolefins having one or multiple long chain branches can have a number average molecular weight ($M_n$) between 500 and 1,000,000 g/mol, preferably between 1,000 and 200,000 g/mol.

The polyolefins having one or multiple functionalized branches according to the present invention preferably have a polydispersity index (Đ or PDI) of between 1.1 and 10.0, more preferably between 1.1 and 5.0, more preferably between 1.1 and 4.0, even more preferably between 1.5 and 2.5.

Step D)

In step D) the polyolefin having one or more pending polar functionalities obtained in step C) is used to obtain a graft copolymer by transesterification of a preformed transesterifiable polymer, especially a preformed polyester and/or a preformed polycarbonate and/or by ring-opening polymerization of cyclic monomers, especially cyclic esters (lactones) and/or cyclic carbonates.

In step D) one or more side chains, especially polyester and/or polycarbonate side chains, may thus be formed on the polyolefin main chain, wherein as initiators the pending polar functionalities on the polyolefin main chain obtained in step C) can be used to obtain a graft copolymer. Thus, the product of step C) is subsequently used in step D) as a macro-initiator for the formation of graft copolymer.

Preformed transesterifiable polymer, especially preformed polyester and/or a preformed polycarbonate, in the sense of the present invention may thereby mean for example commercially available or otherwise prepared or obtained before and/or independently from at least one or preferably all of the steps A), B), C) and D) according to the invention.

Step D) can be carried out in a hydrocarbon solvent, especially for example heptane, octane, decaline or an aromatic hydrocarbon solvent like toluene or xylene, or in other organic solvents, like DMF or tetrachloroethane, or in the melt.

A polyolefin-based graft copolymer obtained according to the present invention may comprise a first long chain branched polyolefin block and one or more polymer side chains and may have a number average molecular weight ($M_n$) between 500 and 1,000,000 g/mol, preferably between 2,000 and 500,000 g/mol, preferably between 5,000 and 250,000 g/mol, further preferred between 10,000 and 100,000 g/mol and/or a polydispersity index (Đ) of between 1.1 and 10.0, preferably between 2.0 and 5.0, whereby said polyolefin block may further optionally have for example a branching number determined by NMR of 0.2 to 10, preferably 0.5 to 5, even more preferred 1 to 3 per 10000 carbon atoms or of 50 to 3500, preferred 100 to 1000, further preferred 200 to 900 per 10000 carbon atoms.

A polyolefin-based graft copolymer according to the invention may further also have polymer side chain(s), whereby the polymer side chain comprise(s) at least one monomer that is different from the monomer(s) of the first long chain branched polyolefin block and/or wherein the grafts are comprise ester and/or carbonate functionalities.

Moreover, the polymer side chain(s) may have a number average molecular weight ($M_n$) between 500 and 1,000,000 g/mol, preferably between 500 and 100,000 g/mol, preferably between 500 and 50,000 g/mol, further preferred between 500 and 25,000 g/mol, alternatively between 500 and 10,000 g/mol, alternatively between 500 and 5,000 g/mol.

The polyolefin-based graft copolymers comprising a first long chain branched polyolefin block and one or multiple polymer side chains prepared according to the present invention may for example be used to introduce polar properties to enhance the interfacial interactions in polyolefins blends with polar polymers, such as for example blends with at least one polyester and/or at least one polycarbonate. They may be used for example as compatibilizers to improve properties such as adhesion. They may be used to improve barrier properties (especially against oxygen) and/or mechanical properties, like improved dimensional stability and/or improved heat resistance and/or improved stiffness, especially for example for polyolefin films. They may be used as compatibilizer to polar polymers such as for example starch or for polyolefin-polar polymer blends, polyolefin-based composites with inorganic fillers, such as glass or talcum. They may be used in drug delivery devices or for nanoporous materials/membranes. They may moreover be used to improve adhesion to other materials, such as for example glass and/or inorganic filers, to improve surface properties, such as for example paintability and/or printability, anti-fogging, anti-static properties. They may furthermore be used to improve chemical resistance and/or acoustic properties for example by reduced squeaking and/or rattling and/or reduced weight.

Examples

The invention is further illustrated by the following non-limiting examples merely used to further explain certain embodiments of the present invention.

General Considerations

All manipulations were performed under an inert dry nitrogen atmosphere using either standard Schlenk or glove box techniques. Dry, oxygen free toluene was employed as solvent for all polymerizations. Catalysts rac-Me$_2$Si(Ind)$_2$ZrCl$_2$, C$_5$Me$_4$(SiMe$_2$NtBu)TiCl$_2$ and rac-Me$_2$Si(Ind)$_2$HfCl$_2$ were purchased from mCAT GmbH, Konstanz, Germany. Methylaluminoxane (MAO, 30 wt. % solution in toluene) was purchased from Chemtura. Tri(isobutyl)aluminum (TIBA, 1.0 M solution in hexanes), tetrachloroethane-d$_2$, diisobutylaluminum hydride solution (1.0 M solution in THF) were purchased from Sigma Aldrich. Trityl tetrakis (pentafluorophenyl)borate was purchased from Acros Organics. ω-Pentadecalactone (PDL) (98%, Sigma-Aldrich) was dried over CaH$_2$ and distilled under reduced pressure. Toluene (Sigma-Aldrich) was dried using an MBraun-SPS-800 purification column system. N'-bis(salicylidene)-2,2-dimethyl-1,3-propanediamine (98%, Sigma-Aldrich) was used as provided. Al(CH$_3$)$_3$ purchased from Aldrich was used in 2 M solution in toluene.

Size Exclusion Chromatography (SEC).

The number average molecular weight ($M_n$) in g/mol and polydispersity index (PDI) were determined by means of high temperature size exclusion chromatography (HT SEC) which was performed at 160° C. using a high speed GPC (Freeslate, Sunnyvale, USA). Detection: IR4 (PolymerChar, Valencia, Spain). Column set: three Polymer Laboratories 13 μm PLgel Olexis, 300×7.5 mm. 1,2,4-Trichlorobenzene (TCB) was used as eluent at a flow rate of 1 mL·min$^{-1}$. TCB was freshly distilled prior to use. The molecular weight was calculated from HT SEC analysis with respect to narrow polyethylene standards (PSS, Mainz, Germany).

Synthesis of di(isobutyl)(oct-7-en-1-yl)aluminum (DIBAO)

Di(isobutyl)(oct-7-en-1-yl)aluminum (DIBAO) was synthesized by hydroalumination of excess 1,7-octadiene using di(isobutyl)aluminum hydride at 60° C. for 6 h in a 200 mL Schlenk flask equipped with a magnetic stirrer. The remaining reagents (for example 1,7-octadiene) after the hydroalumination reaction were removed by evacuation.

Copolymerization Procedure for the Preparation of Hydroxyl-Functionalized Long Chain Branched PE:

Copolymerization reactions of ethylene/di(isobutyl)(oct-7-en-1-yl)aluminum (DIBAO) were carried out in stainless steel Büchi reactors (300 mL). Prior to the polymerization, the reactor was dried in vacuo at 40° C. and flushed with nitrogen. Solvent (toluene), MAO solution (30% w/w in toluene) were introduced into the reactor and stirred at 150 rpm for 20-30 min. A solution of di(isobutyl)(oct-7-en-1-yl) aluminum (DIBAO) comonomer was introduced under nitrogen atmosphere as a second type of olefin monomer comprising a main group metal hydrocarbyl functionality followed by the addition of the predefined amount of diethyl zinc solution, used as chain shuttling agent. The mixture was stirred for 10 min and saturated with lower flow of ethylene. The reaction was started by the addition of the predefined amount 5 micromoles of the catalyst solution under an inert atmosphere. The reactor was then pressurized to the desired pressure (2 bars) with ethylene and the pressure was maintained constant during the polymerization time (30 min) at 40° C. At the end of the reaction, the ethylene feed was stopped and the residual ethylene was vented off. Polymerization conditions for experiments 1 to 5 (Exp. 1 to 5) are listed below in Table 1.

Oxidation

In-situ oxidation procedure using synthetic air: after releasing the residual ethylene pressure, synthetic air was injected through a gas injection tube and the suspension was maintained under constant oxygen pressure at 60° C. for 2 h with rigorous stirring (600 rpm) before quenching with 300 mL of acidic methanol (10% concentrated HCl) to isolate the hydroxyl functionalized material. The resulting white powder was then filtered, washed with methanol and dried at 60° C. in vacuo overnight.

to room temperature and quenched using acidified methanol, isolated and dried in vacuum at room temperature for 18 h.

Typical Polymerization Procedure for the Preparation of PCL Via ROP of Caprolactone.

In a glovebox, caprolactone (500 mg), Al-salen catalyst (74 μmol) and an equimolar amount of benzyl alcohol (8 mg, 74 μmol) were placed in a small glass crimp cap vial. Dry toluene was added (1 mL) and the vial was capped. The reaction mixture was removed from the glovebox and put in a carrousel reactor at 100° C. For all reactions, an aliquot of crude polymer was withdrawn at the end of the polymerization reaction and dissolved in $CDCl_3$ in order to determine the conversion of the monomers by $^1H$ NMR spectroscopy. The reaction was then stopped by quenching the crude product with acidic ethanol solution (5 mL) to precipitate the polymer. The polymers were dried at 40° C. for 24 h under reduced pressure.

Typical Procedure for Synthesis of PE-Graft-PCL Copolymers Via Transesterification.

The experiments were carried out in a micro compounder MC15 ml from Xplore equipped with co-rotating screws, a barrel with three 3 temperature zones and a nitrogen purge at 150° C. (three temperature zones set to 150° C.) with a screw RPM setting at 100. Hydroxyl-functionalized long chain branched PE obtained in experiment 2 above (see Table 1, 8.0 g) and PCL (2.0 g, $M_n$=25.6 kg/mol, Đ=1.3, prepared with the Al-salen catalyst according to the method described above) were fed into a corotating twin screw micro compounder MC15 ml from Xplore equipped with co-rotating screws, a barrel with three 3 temperature zones

TABLE 1

| Exp. | Catalyst | cocatalyst | cocat.: cat | com:Zn:cat | Act. (kg/mol · h) | $T_m$ (° C.)[c] | $M_n$ (kg/mol) (PDI)[d] |
|---|---|---|---|---|---|---|---|
| 1 | rac-Me₂Si(Ind)₂ZrCl₂ | MAO | 760 | 250:25:1 | 2300 | 126.8 | 8.6 (2.9) |
| 2 | rac-Me₂Si(Ind)₂ZrCl₂ | [Ph3C][B(C6F5)4] | 2.0 | 250:25:1 | 1620 | 125.6 | 23.0 (3.0) |
| 3 | C₅Me₄(SiMe₂NtBu)TiCl₂ | MAO | 800 | 300:20:1 | 1230 | 123.0 | 15.2 (3.5) |
| 4 | C₅Me₄(SiMe₂NtBu)TiCl₂ | [Ph3C][B(C6F5)4] | 2.0 | 300:20:1 | 1020 | 124.0 | 22.3 (3.0) |
| 5 | rac-Me₂Si(Ind)₂HfCl₂ | MAO | 1000 | 300:20:1 | 960 | 123.9 | 19.2 (2.3) |
| 6 | rac-Me₂Si(Ind)₂HfCl₂ | [Ph3C][B(C6F5)4] | 2.0 | 300:20:1 | 780 | 125.5 | 29.3 (3.3) |

Synthesis of Al-Salen Catalyst

N,N'-bis(salicylidene)-2,2-dimethyl-1,3-propanediamine (2.0 g, 5.7 mmol) was suspended in toluene (30 mL) under $N_2$ flow. Subsequently, $Al(CH_3)_3$ (2 M solution in toluene, 2.85 mL, 5.7 mmol) was added via syringe and the mixture was stirred at room temperature. The thus obtained solution was concentrated to half the original volume and pale yellow needles of Al-salen catalyst were isolated with a yield of 90%.

Typical Procedure for Synthesis of PE-Graft-PPDL Copolymers Via Catalytic ROP.

A glass crimp cap vial was charged with PDL (1.15 g, 4.8 mmol) and Al-salen catalyst (1.68 mg, 5 μmol), hydroxyl-functionalized long chain branched PE obtained in experiment 2 above (see Table 1, 5 μmol) and toluene (1.50 g, 16.3 mmol). All manipulations were carried out in the glovebox. Then, the mixture was removed from the glovebox and stirred in an oil bath at 100° C. The progress of the reaction was followed by $^1H$ NMR spectroscopy by taking aliquots at set time intervals. The synthesized copolymer was cooled and a nitrogen purge at 150° C. (three temperature zones set to 150° C.) with a screw RPM setting at 100. The polymers were premixed for 5 minutes. Then the catalyst $Sn(Oct)_2$ (0.19 g, 0.5 mmol) was added and the mixture was stirred in the extruder for 2 minutes. After this time the extruder was evacuated. The copolymer was purified by dissolution in m-xylene at 120° C. and precipitation in a cold acetone. The copolymer was dried in a vacuum oven for 48 h at room temperature.

The invention claimed is:

1. A process for the preparation polyolefin-based graft copolymers comprising a first long chain branched polyolefin block and one or multiple polymer side chains, said process comprising the step of:
   A) a polymerization step comprising copolymerizing at least one first type of olefin monomer and at least one second type of olefin monomer comprising a main group metal hydrocarbyl functionality according to Formula 1a:

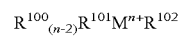

Formula 1a using a catalyst system to obtain a polyolefin; wherein said catalyst system comprises a catalyst or catalyst precursor comprising a metal from Group 3-10 of the IUPAC Periodic Table of elements that can undergo chain transfer polymerization with the main group metal hydrocarbyl functionality of the second type of olefin monomer or that via a chain shuttling agent can undergo chain transfer polymerization with the main group metal hydrocarbyl functionality of the second type of olefin monomer, and optionally at least one of a co-catalyst or a scavenger, and wherein further M is a main group metal; n is the oxidation state of M; $R^{100}$, $R^{101}$ and $R^{102}$ of Formula 1a are each independently selected from the group consisting of a hydride, a C1-C18 hydrocarbyl group, or a hydrocarbyl group Q on the proviso that at least one of $R^{100}$, $R^{101}$ and $R^{102}$ is a hydrocarbyl group Q, wherein hydrocarbyl group Q is according to Formula 1b:

(Formula 1b)

wherein Z is bonded to M and Z is a C1-C18 hydrocarbyl group; $R^{105}$ optionally forms a cyclic group with Z; wherein $R^{103}$ and $R^{104}$ and $R^{105}$ are each independently selected from hydrogen or a hydrocarbyl group;

B) an oxidizing step comprising contacting said polyolefin obtained in step A) with at least one oxidizing agent to obtain a polyolefin having one or more pending oxidized functionalities; a C) contacting said polyolefin obtained in step B) with at least one quenching agent to obtain a polyolefin having one or more pending polar functionalities, and D) using the polyolefin having one or more pending polar functionalities obtained in step C) to obtain a graft copolymer by transesterification of a preformed transesterifiable polymer and/or by ring-opening polymerization of cyclic monomers.

2. A process according to claim 1, wherein said oxidizing agent used in step B) is an oxidizing agent according to Formula I:

wherein a is 1, b and c are each independently 0 or 1 and X, Y, $Z^1$ and $Z^2$ are independently selected from carbon, hydrocarbyl or heteroatom.

3. A process according to claim 1, wherein the oxidizing agent used in step B) is selected from the group consisting of CO, $CO_2$, $CS_2$, COS, $R^2NCO$, $R^2NCS$, $R^2NCNR^3$, $CH_2=C(R^2)C(=O)OR^3$, $CH_2=C(R_2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R^4C=NR^2$, $R^2C(=O)R^3$, $ClC(=O)OR^2$ and $SO_3$.

4. A process according to claim 1, wherein at least one of $R^{100}$, $R^{101}$ and $R^{102}$ is a hydrocarbyl group Q and the remaining groups of $R^{100}$, $R^{101}$ and $R^{102}$ are each a C1-C4 hydrocarbyl group or wherein two groups of $R^{100}$, $R^{101}$ and $R^{102}$ are each a hydrocarbyl group Q and the remaining group of $R^{100}$, $R^{101}$ and $R^{102}$ is a C1-C4 hydrocarbyl group or wherein all of $R^{100}$, $R^{101}$ and $R^{102}$ are a hydrocarbyl group Q.

5. A process according to claim 1, wherein the hydrocarbyl group Q according to Formula 1b attached to a main group metal is a linear α-olefin group or a cyclic unsaturated hydrocarbyl group.

6. A process according to claim 1, wherein at least one type of olefin monomer comprises a main group metal hydrocarbyl functionality that is selected from the group consisting of bis(isobutyl)(5-ethylen-yl-2-norbornene) aluminum, di(isobutyl)(7-octen-1-yl) aluminum, di(isobutyl) (5-hexen-1-yl) aluminum, di(isobutyl)(3-buten-1-yl) aluminum, tris(5-ethylen-yl-2-norbornene) aluminum, tris(7-octen-1-yl) aluminum, tris(5-hexen-1-yl) aluminum, or tris (3-buten-1-yl) aluminum, ethyl(5-ethylen-yl-2-norbornene) zinc, ethyl(7-octen-1-yl) zinc, ethyl(5-hexen-1-yl) zinc, ethyl(3-buten-1-yl) zinc, bis(5-ethylen-yl-2-norbornene) zinc, bis(7-octen-1-yl) zinc, bis(5-hexen-1-yl) zinc, or bis (3-buten-1-yl) zinc.

7. A process according to claim 1, wherein the catalyst system comprises the co-catalyst, and the co-catalyst is selected from the group consisting of TEA, DEAC, MAO, DMAO, MMAO, SMAO, optionally in combination with an aluminum alkyl.

8. A process according to claim 1, wherein the metal catalyst or metal catalyst precursor used in step A) comprises a metal from Group 3-8 of the IUPAC Periodic Table of elements.

9. A process according to claim 8, wherein said metal catalyst or catalyst precursor is a Ziegler-Natta catalyst and/or a $C_s$-, $C_1$-, or $C_2$-symmetric zirconium metallocene.

10. A process according to claim 8, wherein said metal catalyst or metal catalyst precursor is [Me$_2$Si(C$_5$Me$_4$)N (tBu)]TiCl$_2$, Me$_2$Si(2-Me-4-Ph-Ind)$_2$HfCl$_2$, [C$_5$Me$_4$CH$_2$CH$_2$N(n-Bu)$_2$]TiCl$_2$, bis(n-propyl-cyclopentadienyl)ZrCl$_2$, bis(n-butyl-cyclopentadienyl)ZrCl$_2$.

11. A process according to claim 1, wherein the at least one type of olefin monomer used in step A) is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, cyclopentene, cyclohexene, norbornene, ethylidene-norbornene, and vinylidene-norbornene and one or more combinations thereof.

12. A process according to claim 1, wherein an additional main group metal hydrocarbyl chain transfer agent is used in step A), and the additional main group metal hydrocarbyl chain transfer agent is selected from the group consisting of: hydrocarbyl aluminum, hydrocarbyl magnesium, hydrocarbyl zinc, hydrocarbyl gallium, hydrocarbyl boron, hydrocarbyl calcium and one or more combinations thereof.

13. A polyolefin-based graft copolymer comprising a first long chain branched polyolefin block and one or multiple polymer side chains obtained by a process according to claim 1, the polyolefin-based graft copolymer having a number average molecular weight ($M_n$) between 500 and 1,000,000 g/mol and having a polydispersity index (Đ) of between 1.1 and 10.0 and wherein said polyolefin block has a branching number determined by NMR of 0.2 to 10 per 10000 carbon atoms or of 50 to 3500 per 10000 carbon atoms.

14. A polyolefin-based graft copolymer according to claim 13, wherein the polymer side chain(s) comprise at least one monomer that is different from the monomer(s) of the first long chain branched polyolefin block and/or wherein the grafts are comprise ester and/or carbonate functionalities.

15. A polyolefin-based graft copolymer according to claim 13, the polymer side chain(s) having a number average molecular weight ($M_n$) between 500 and 1,000,000 g/mol.

16. A process according to claim 1, wherein the oxidizing agent used in step B) is selected from the group consisting of $N_2O$, $CO_2$ and $SO_3$.

17. A process according to claim 1, wherein the hydrocarbyl group Q according to Formula 1b attached to a main group metal is but-3-en-1-yl, pent-4-en-1-yl, hex-5-en-1-yl, hept-6-en-1-yl or oct-7-en-1yl, 5-ethylenebicyclo[2.2.1]hept-2-ene or 5-propylenebicyclo[2.2.1]hept-2-ene.

18. A process according to claim 1, wherein a metal catalyst or metal catalyst precursor used in step A) comprises a metal selected from the group consisting of Ti, Zr, Hf, V, Cr, Fe, Co, Ni, and Pd.

19. A process according to claim 9, wherein said metal catalyst or catalyst precursor is a bridged bis-indenyl zirconium dihalide.

20. A process according to claim 7, wherein
the oxidizing agent used in step B) is selected from the group consisting of $N_2O$, $CO_2$ and $SO_3$;
the hydrocarbyl group Q according to Formula 1b attached to a main group metal is but-3-en-1-yl, pent-4-en-1-yl, hex-5-en-1-yl, hept-6-en-1-yl or oct-7-en-1yl, 5-ethylenebicyclo[2.2.1]hept-2-ene or 5-propylenebicyclo[2.2.1]hept-2-ene;
a metal catalyst or metal catalyst precursor used in step A) comprises rac-dimethylsilyl bis-indenyl zirconium dichloride (rac-$Me_2Si(Ind)_2ZrCl_2$) or rac-dimethylsilyl bis-(2-methyl-4-phenyl-indenyl) zirconium dichloride (rac-$Me_2Si(2$-Me-4Ph-$Ind)_2ZrCl_2$); and
the aluminum alkyl is triisobutyl aluminum.

21. A polyolefin-based graft copolymer according to claim 13, wherein the grafts comprise ester and/or carbonate functionalities.

22. A process according to claim 8, wherein the metal catalyst or catalyst precursor is a Ziegler-Natta catalyst.

* * * * *